United States Patent
Parkinson et al.

(10) Patent No.: US 12,531,099 B2
(45) Date of Patent: Jan. 20, 2026

(54) READ FOR MEMORY CELL WITH THRESHOLD SWITCHING SELECTOR

(71) Applicant: Sandisk Technologies, Inc., Milpitas, CA (US)

(72) Inventors: Ward Parkinson, Boise, ID (US); Michael Grobis, Campbell, CA (US); James O'Toole, Boise, ID (US); Thomas Trent, Tucson, AZ (US); Michael Nicolas Albert Tran, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 180 days.

(21) Appl. No.: 18/482,538

(22) Filed: Oct. 6, 2023

(65) Prior Publication Data

US 2025/0118349 A1    Apr. 10, 2025

(51) Int. Cl.
   *G11C 11/00*    (2006.01)
   *G11C 11/16*    (2006.01)
   *H10B 61/00*    (2023.01)

(52) U.S. Cl.
   CPC ...... *G11C 11/1673* (2013.01); *G11C 11/1659* (2013.01); *H10B 61/10* (2023.02)

(58) Field of Classification Search
   CPC ............ G11C 11/1673; G11C 11/1659; G11C 2213/76; G11C 11/1675; G11C 11/1693; G11C 13/0004; G11C 13/003; G11C 13/004; G11C 13/0061; G11C 13/0069; G11C 8/08; G11C 11/1655; G11C 11/1657; H10B 61/10

USPC .......................................................... 365/158
See application file for complete search history.

(56) References Cited

U.S. PATENT DOCUMENTS

| | | | |
|---|---|---|---|
| 6,859,383 B2 | 2/2005 | Baker | |
| 7,116,598 B2 * | 10/2006 | Shimizu | G11C 7/062 365/158 |
| 9,852,783 B1 | 12/2017 | Na et al. | |
| 9,972,373 B2 | 5/2018 | Andre et al. | |
| 11,309,005 B2 | 4/2022 | Gupta et al. | |
| 11,676,648 B2 | 6/2023 | Gupta et al. | |
| 2018/0301198 A1 | 10/2018 | Chung | |

(Continued)

FOREIGN PATENT DOCUMENTS

TW    202121177 A    6/2021

*Primary Examiner* — Tha-O H Bui
(74) *Attorney, Agent, or Firm* — Pearl Cohen Zedek Latzer Baratz LLP

(57) ABSTRACT

Technology for reading memory cells having threshold switching selectors. A sense amplifier may have a set of capacitors that may be used to exchange charge with a sense node connected to the selected word line. A capacitor may be used to pull excess charge from the sense node or to provide charge to the sense node. A control circuit drives a current to the selected word line to charge up the selected word line to switch on the threshold switching selector of the selected memory cell. A capacitor may be connected to the selected word line when, or soon after, the threshold switching selector switches on. The capacitor may draw away excess charge to prevent a snapback current from flowing through the memory cell thereby preventing mis-reads. The capacitor may reduce read latency by speeding the rate of voltage change on a word line.

19 Claims, 21 Drawing Sheets

(56) References Cited

U.S. PATENT DOCUMENTS

2019/0013056 A1\* 1/2019 Nobunaga ............ G11C 11/1673
2023/0247843 A1 8/2023 Mosendz et al.

\* cited by examiner

| Signal | Description | Time | | | | |
|---|---|---|---|---|---|---|
| | | 0 | 1 | 2 | 3 | 4 |
| Read | Enable Read Current | | ■ | ■ | ■ | ■ |
| Precharge | Precharge the Capacitors | ■ | | | | |
| Trap | Enable Signal into Sense Amp | ■ | | ■ | ■ | |
| S1 | Enable VXSP Connection | ■ | | ■ | ■ | ■ |
| S2 | Enable Vref Connection | | | | ■ | ■ |
| S3 | Enable Snapback Discharge Cap (C1) | ■ | | ■ | | |
| Clock | Clock out Sense Amp Output | | | | | ■ |

| Signal | Description | 0 | 1 | 2 | 3 | 4 | 5 | 6 | 7 | 8 | 9 | 10 |
|---|---|---|---|---|---|---|---|---|---|---|---|---|
| Read | Enable Read Current |  | ■ | ■ | ■ |  |  |  | ■ | ■ | ■ |  |
| Write Reset | Enable Write Reset Current |  |  |  |  | ■ | ■ | ■ |  |  |  |  |
| Precharge | Precharge the Capacitors | ■ | ■ | ■ | ■ | ■ | ■ | ■ |  |  |  |  |
| Trap | Enable Signal into Sense Amp |  |  | ■ | ■ |  |  |  | ■ | ■ | ■ |  |
| S1 | Enable VXSP Connection |  |  | ■ |  |  |  |  |  |  |  |  |
| S3 | Enable Snapback Discharge Cap (C1) |  |  |  | ■ |  |  |  |  |  | ■ |  |
| S4 | Enable Read Reference Cap (C2) |  |  |  |  |  |  |  | ■ | ■ |  |  |
| S5 | Enable Write Reset Discharge Cap (C3) |  |  |  | ■ |  |  |  |  |  |  |  |
| Sample | Enable Read Reference Cap (C2) to VXSP Connection |  |  |  |  |  |  |  | ■ |  |  |  |
| Bump | Bump Sampled Read Voltage |  |  |  |  |  | ■ | ■ | ■ | ■ | ■ |  |
| Clock | Clock out Sense Amp Output |  |  |  |  |  |  |  |  |  | ■ |  |

Time

| Signal | Description | 0 | 1 | 2 | 3 | 4 | 5 | 6 | 7 | 8 | 9 | 10 |
|---|---|---|---|---|---|---|---|---|---|---|---|---|
| Read | Enable Read Current | | ■ | ■ | ■ | | | | ■ | ■ | ■ | |
| Write Reset | Enable Write Reset Current | | | | | ■ | ■ | ■ | | | | |
| Precharge | Precharge the Capacitors | ■ | | | | | | | | | | |
| Trap | Enable Signal into Sense Amp | ■ | | ■ | ■ | ■ | | | ■ | ■ | | |
| S1 | Enable VXSP Connection | ■ | | | ■ | | | | | ■ | ■ | |
| S3 | Enable Snapback Discharge Cap (C1) | ■ | | ■ | | | | | ■ | | | |
| S4 | Enable Read Reference Cap (C2) | | | | | ■ | | | | | ■ | |
| S6 | Enable Write Reset Charge Cap (C4) | | | | ■ | | | | | ■ | | |
| S5 | Enable Write Reset Discharge Cap (C3) | | | | | | | | ■ | | | |
| Sample | Enable Read Reference Cap (C2) to VXSP Connection | | | | ■ | | ■ | ■ | | | | |
| Bump | Bump Sampled Read Voltage | | | | | | | | ■ | ■ | ■ | |
| Clock | Clock out Sense Amp Output | | | | | | | | | ■ | ■ | |

2000

| Signal | Description | Time | | | |
| --- | --- | --- | --- | --- | --- |
| | | 11 | 12 | 13 | 14 |
| Write Set | Enable Write Set Current | | ■ | ■ | ■ |
| Trap | Enable Signal into Sense Amplifier | ■ | | | |
| Precharge | Precharge the Capacitor | | | | |
| S1 | Enable VXSP Connection | | ■ | | |
| S7 | Enable Write Set Charge Capacitor (C5) | | ■ | | |

READ FOR MEMORY CELL WITH THRESHOLD SWITCHING SELECTOR

BACKGROUND

Memory is widely used in various electronic devices such as cellular telephones, digital cameras, personal digital assistants, medical electronics, mobile computing devices, non-mobile computing devices, and data servers. Memory may comprise non-volatile memory or volatile memory. A non-volatile memory allows information to be stored and retained even when the non-volatile memory is not connected to a source of power (e.g., a battery). Non-volatile memory can be made to appear non-volatile at least for a limited time by, external to the memory chip, adding battery back to the power supply.

The memory cells may reside in a cross-point memory array. In a memory array with a cross-point type architecture, one set of conductive lines run across the surface of a substrate and another set of conductive lines are formed above the other set of conductive lines running in an orthogonal direction relative to the initial layer. The memory cells are located at the cross-point junctions of the two sets of conductive lines.

A programmable resistance memory cell is formed from a material having a programmable resistance. In a binary approach, the programmable resistance memory cell can be programmed into one of two resistance states: high resistance state (HRS) and low resistance state (LRS). In some approaches, more than two resistance states may be used. One type of programmable resistance memory cell is a magnetoresistive random access memory (MRAM) cell. An MRAM cell uses magnetization to represent stored data, in contrast to some other memory technologies that use electronic charges (DRAM) or voltages (SRAM) to store data. A bit of data is written to an MRAM cell by changing the direction of magnetization of a magnetic element ("the free layer") within the MRAM cell, and a bit is read by measuring the resistance of the MRAM cell, such resistance changing with the direction of magnetization.

In a cross-point memory array, each memory cell may contain a threshold switching selector in series with the material having the programmable resistance. The threshold switching selector has a high resistance (in an off or non-conductive state) until it is biased to a voltage higher than its threshold voltage (Vt) or current above its threshold current, (It), and until its voltage bias falls below Vhold ("Voffset") or current below a holding current Ihold. After the Vt is exceeded and while Vhold is exceeded across the threshold switching selector, the threshold switching selector has a relatively lower resistance (in an on or conductive state). The threshold switching selector remains on until its current is lowered below a holding current Ihold, or the voltage is lowered below a holding voltage, Vhold. When this occurs, the threshold switching selector returns to the off (higher) resistance state. To read a memory cell, the threshold switching selector is activated by being turned on before the resistance state of the memory cell is determined. One example of a threshold switching selector is an Ovonic Threshold Switch (OTS). Other examples of threshold switching selectors include, but are not limited to, Volatile Conductive Bridge (VCB), Metal-Insulator-Metal (MIM), or other material that provides a highly non-linear dependence of current on select voltage.

In a forced current technique for reading programmable resistance memory cells in a cross-point array, a current is driven to the memory cell that is address selected for read ("selected memory cell") in one direction. An address selected wire in the Y direction is actively driven to the opposite direction power supply; e.g. voltage forced. The current will charge up the voltage across the selected memory cell until the threshold switching selector turns on. Then, while the read current is driven through the programmable resistance memory element of the selected memory cell, the voltage across the selected cell is sensed.

One technique for reading programmable resistance memory cells may be referred to as a globally referenced read. A globally referenced read is sometimes referred to as a midpoint read or midpoint referenced read. A globally referenced read may use a reference voltage that is between the lower resistance state (LRS) and the higher resistance state (HRS). Here, the LRS and HRS refer to the voltage that appears across the cell in response to the read current. For example, the midpoint reference may be a reference voltage that is midway between two voltages that correspond to sensing a cell having either the LRS or the HRS. In a forced current approach, memory cell's state is determined based on whether the sensed voltage, Vsense, is higher or lower than the midpoint reference voltage, VREF.

Another technique for reading programmable resistance memory cells is commonly referred to as a destructive self-referenced read (SRR). In an SRR, rather than using a midpoint reference that is independent of the state of the cell, the reference is generated based on sensing the cell itself. In a destructive SRR, it is possible that the state of the memory cell is changed (e.g., destroyed) by a write operation of the SRR. One SRR technique includes a first read (Read1), a destructive write to a known state (e.g., the high resistance state HRS), and a second read (Read2). The results of the two reads are compared to determine the original state of the cell. One technique for the first read is to apply a read current through the memory cell, resulting in a voltage across the cell having a magnitude that is representative of the resistance of the memory cell. The voltage is stored and may be adjusted (for example, up or down by 150 mv) for comparison with a voltage sample from the second read. The voltage adjustment can be approximately half the signal difference across the MRAM for each state. For example, if the MRAM low resistance state (LRS) is 25 Kohm, the high resistance state 50 Kohm, and the read current 15 ua, the difference from a state change is 375 mV so an adjustment of approximately 180 mV could be made from Read1 stored voltage of SRR. The determination of the original state of the memory cell depends on the difference between the first adjusted read voltage and the second read voltage. For example, if the first sampled voltage from Read1 of SRR was adjusted up and the write was to the HRS, then if the cell was originally in the HRS then the second sampled voltage from Read2 should be about the same as Read1 and therefore lower than the first adjusted up voltage. However, if the cell was originally in the LRS, then the second sampled voltage from Read2 should be higher than the adjusted up voltage from Read1 due to the higher Read2 voltage resulting from writing the bit from low resistance LRS to the HRS.

For both mid-point reads during SRR, signals, voltages and currents are applied to conductive lines such as word lines and/or bit lines. The time to complete the read will depend on the time for the voltages on the word lines and/or bit lines to reach a stable voltage.

Memory elements such as, but not limited to MRAM and OTS elements, could inadvertently have their state changed due to currents that flow through the memory elements during the read operation. The switching on of a threshold switching selector can result in a snapback current flow through the memory element, which could potentially change the state of the MRAM memory element prior to sensing the memory element.

BRIEF DESCRIPTION OF THE DRAWINGS

Like-numbered elements refer to common components in the different figures.

FIG. 13 is a table that indicates timing of signals in the sense amp for an embodiment of a globally referenced read in which capacitor C1 is used as a snapback discharge capacitor.

FIG. 15 is a table that indicates timing of signals in the sense amp for an embodiment of an SRR in which capacitor C1 is used as a snapback discharge capacitor.

FIG. 16 is a table that indicates timing of signals in the sense amp for an embodiment of an SRR in which capacitor C4 is used as a write reset charge capacitor.

DETAILED DESCRIPTION

Figure 1:
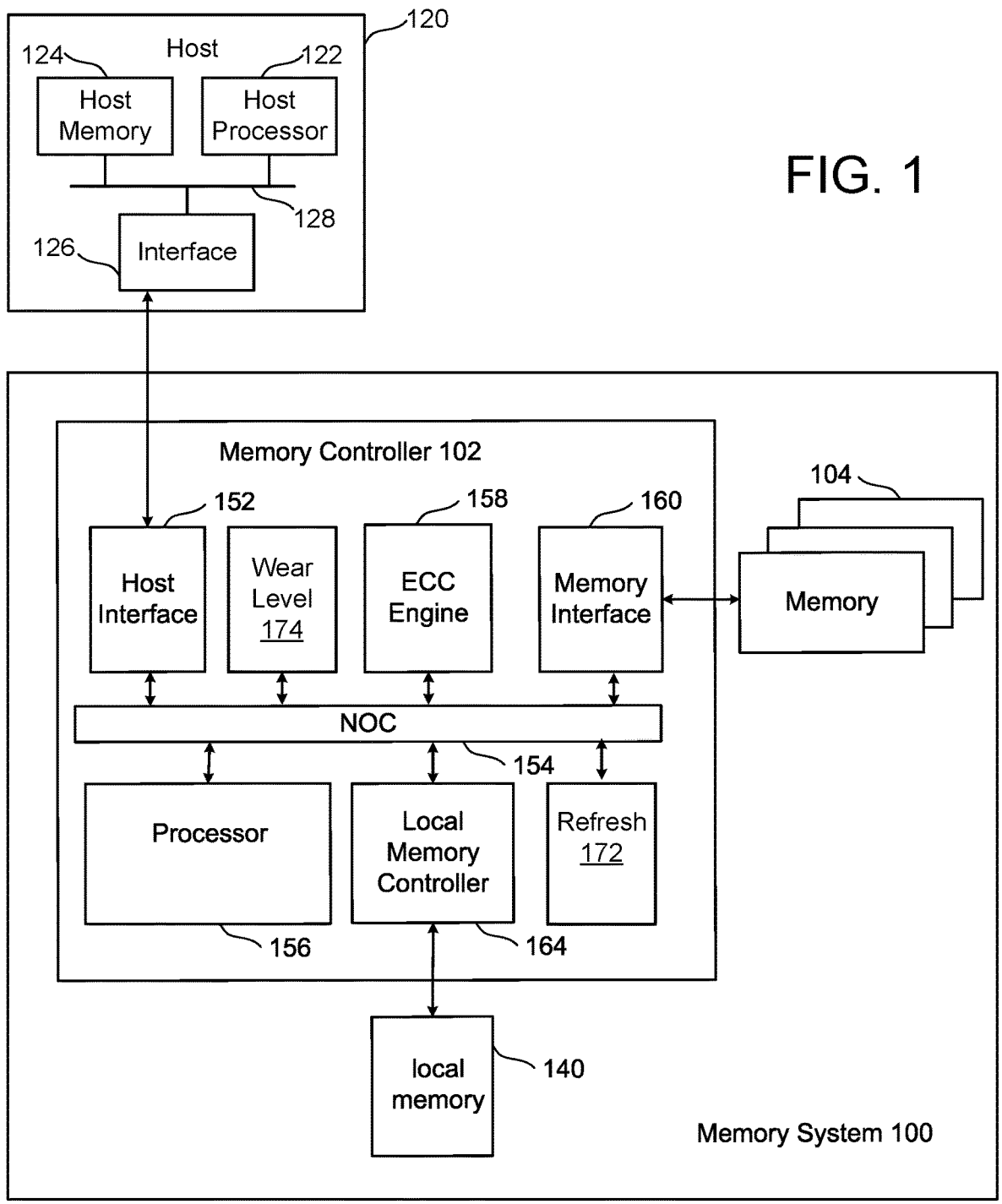
FIG. 1 is a block diagram of one embodiment of a non-volatile memory system connected to a host.

Technology is disclosed for a memory system and method for reading memory cells having threshold switching selectors. In an embodiment, a capacitor is used to exchange charge with a sense node connected to a selected conductive line, which is in turn connected to a selected memory cell. For example, the capacitor may be used to pull excess charge from the sense node to speed the rate at which voltage falls on the selected word line in order to reduce read latency. In an embodiment, the capacitor may be used to provide charge to speed the rate at which voltage rises on the selected word line in order to reduce read latency. In an embodiment, the capacitor draws away charge that may have otherwise flowed through the selected memory cell after a snapback of the threshold switching selector to thereby prevent the state of the memory cell from flipping. Therefore, misreads are prevented.

In some embodiments, a sense amplifier has a set of capacitors that may be used to exchange charge with a sense node connected to the selected word line. A control circuit drives a current to the selected word line to charge up the selected word line to switch on the threshold switching selector of the selected memory cell. In an embodiment, a capacitor is connected to the selected word line when, or soon after, the threshold switching selector switches on. Switching on the threshold switching selector could potentially result in a snapback current undesirably flowing through the memory cell. If a significant snapback current were to flow through the memory cell, the state of the memory cell could be changed thereby leading to a mis-read. The capacitor may draw away excess charge to thereby prevent such a snapback current from flowing through the memory cell, thereby preventing mis-reads. Moreover, the capacitor may reduce the time it takes for the word line voltage to settle at a stable voltage (Vfinal) for sensing the memory cell state. Therefore, read latency is reduced. In one embodiment, a capacitor is used in a globally referenced read to exchange charge with a sense node connected to the selected word line. In one embodiment, a capacitor is used in an SRR to exchange charge with a sense node connected to the selected word line.

The set of capacitors can be used at various times in an SRR. A capacitor may be used to speed the rate at which the voltage on the selected word line is increased for a destructive write of the SRR. A capacitor may be used to speed the rate at which the voltage on the selected word line is decreased after the destructive write of the SRR. A capacitor may be used to speed the rate at which the voltage on the selected word line is increased and/or decreased during a writeback phase of the SRR in which the original state of the memory cell is restored.

In an embodiment the memory system is used to read programmable resistance memory cells that reside in a cross-point memory array. In a memory array with a cross-point type architecture, one set of conductive lines run across the surface of a substrate and another set of conductive lines are formed over the other set of conductive lines, running over the substrate in a direction perpendicular to the other set of conductive lines. The memory cells are located at the cross-point junctions of the two sets of conductive lines. Cross-point memory arrays are sometimes referred to as cross-bar memory arrays. In an embodiment, the memory cells each have a magnetoresistive memory element in series with an OTS, which may be referred to as MRAM memory cell. However, the cross-point memory array may have other types of memory cells. For example, the cross-point memory array may have memory cell of other technologies such as ReRam, PCM (Phase Change Memory), FeRam. Also, the threshold switching selector is not required to be an OTS.

In some embodiments, the programmable resistance memory cell has a magnetoresistive random access memory (MRAM) element. As used herein, direction of magnetization is the direction that the magnetic moment is oriented with respect to a reference direction set by another element of the MRAM ("the reference layer"). In some embodiments, the low resistance is referred to as a parallel or P-state or LRS, and the high resistance is referred to as an anti-parallel or AP-state or HRS. MRAM can use the spin-transfer torque effect to change the direction of the magnetization from P-state to AP-state and vice-versa, which typically requires bipolar (bi-directional write) operation for writes. However, SRR of programmable resistance memory cells as disclosed herein is not limited to memory cells having MRAM elements or OTS elements.

FIG. 1 is a block diagram of one embodiment of a non-volatile memory system (or more briefly "memory system") 100 connected to a host system 120. Memory system 100 can implement the technology presented herein for a system for reading a memory cell having a threshold switching selector. In an embodiment, the memory cells have a programmable resistance memory element (e.g., MRAM element) in series with a threshold switching selector such as an OTS. Many types of memory systems can be used with the technology proposed herein. Example memory systems include dual in-line memory modules (DIMMs), solid state drives ("SSDs"), memory cards and embedded memory devices; however, other types of memory systems can also be used.

Memory system 100 of FIG. 1 comprises a memory controller 102, memory 104 for storing data, and local memory 140 (e.g., MRAM, ReRAM, DRAM). The local memory 140 may be non-volatile and retain data after power off. The local memory 140 may be volatile and not be expected to retain data after power off. In one embodiment the local memory 140 is MRAM. In an embodiment, the local memory MRAM is not required to retain data after power-off. However, the local memory MRAM may retain data after power-off. In one embodiment, memory controller 102 and/or local memory controller 164 provides access to programmable resistance memory cells in local memory 140. For example, memory controller 102 may provide for access in a cross-point array of MRAM cells in local memory 140. In another embodiment the memory controller 102 or interface 126 or both are eliminated and the memory packages are connected directly to the host 120 through a bus such as DDRn. Or they are connected to a Host memory management unit (MMU). In another instance, the memory controller 102 or portions are moved onto the Memory 104 for direct connection of the Memory 104 to the Host, such as by providing parity bits, ECC, and wear level on the Memory 104 along with an DDRn interface to/from the Host or MMU. The term memory system, as used throughout this document, is not limited to memory system 100. For example, the local memory 140 or the combination of local memory 140 and local memory controller 164 could be considered to be a memory system. Likewise, host memory 124 or the combination of host processor 122 and host memory 124 considered to be a memory system.

The components of memory system 100 depicted in FIG. 1 are electrical circuits. The memory controller 102 has host interface 152, processor 156, ECC engine 158, memory interface 160, local memory controller 164, refresh logic 172, and wear level 174. The host interface 152 is connected to and in communication with host 120. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, local memory controller 164, refresh logic 172, and wear level 174. Local memory controller 164 is used to operate and communicate with local high speed memory 140 (e.g., MRAM). In other embodiments, local high speed memory 140 can be DRAM, SRAM or another type of volatile memory.

ECC engine 158 performs error correction services. For example, ECC engine 158 performs data encoding and decoding of parity bits provided on or off the memory as part of the code word used for error correction of the data fetched from memory 140 or 104. In one embodiment, ECC engine 158 is an electrical circuit programmed by software. For example, ECC engine 158 can be a processor that can be programmed. In other embodiments, ECC engine 158 is a custom and dedicated hardware circuit without any software. In one embodiment, the function of ECC engine 158 is implemented by processor 156. In one embodiment, local memory 140 has an ECC engine with or without a wear level engine. In one embodiment, memory 104 has an ECC engine with or without a wear level engine.

Processor 156 performs the various controller memory operations, such as programming, erasing, reading, and memory management processes including wear level. A separate wear level 174 is depicted, but the wear level 174 may be implemented by processor 156. Also, refresh logic 172 is depicted, but the refresh may also be implemented by the processor 156. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory dies. To implement this system, memory controller 102 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in memory 104 and a subset of the L2P tables are cached (L2P cache) in the local high speed memory 140.

Memory interface 160 communicates with non-volatile memory 104. In an embodiment, non-volatile memory 104 contains programmable resistance memory cells in a cross-point array. In one embodiment, memory interface provides a Toggle Mode interface. Other interfaces can also be used. In some example implementations, memory interface 160 (or another portion of controller 102) implements a scheduler and buffer for transmitting data to and receiving data from one or more memory die.

In one embodiment, local memory 140 has an ECC engine. Local memory 140 may be used to help perform other functions such as wear leveling. Further details of on-chip memory maintenance are described in U.S. Pat. No. 10,545,692, titled "Memory Maintenance Operations During Refresh Window", and U.S. Pat. No. 10,885,991, titled "Data Rewrite During Refresh Window", both of which are hereby incorporated by reference in their entirety. In an embodiment, the local memory 140 is synchronous. In an embodiment, the local memory 140 is asynchronous.

In one embodiment, memory 104 comprises a plurality of memory packages. Each memory package includes one or more memory dies. Therefore, memory controller 102 is connected to one or more memory dies. In one embodiment, the memory package can include types of memory, such as storage class memory (SCM) based on programmable resistance random access memory (such as ReRAM, MRAM, FeRAM or RRAM) or a phase change memory (PCM). In one embodiment, memory controller 102 provides access to memory cells in a cross-point array in a memory package 104.

Memory controller 102 communicates with host system 120 via an interface 152 that implements a protocol such as, for example, Compute Express Link (CXL). Or such controller can be eliminated and the memory packages can be placed directly on the host bus, DDRn or CXL for examples. For working with memory system 100, host system 120 includes a host processor 122, host memory 124, and interface 126 connected along bus 128. Host memory 124 is the host's physical memory, and can be DRAM, SRAM, ReRAM, MRAM, non-volatile memory, or another type of storage. In an embodiment, host memory 124 contains a cross-point array of programmable resistance memory cells, with each memory cell comprising a programmable resistance memory element and a threshold switching selector in series with the programmable resistance memory element.

Host system 120 is external to and separate from memory system 100. In one embodiment, memory system 100 is embedded in host system 120. Host memory 124 may be referred to herein as a memory system. The combination of the host processor 122 and host memory 124 may be referred to herein as a memory system. In an embodiment, such host memory can be cross-point memory using MRAM.

Figure 2:
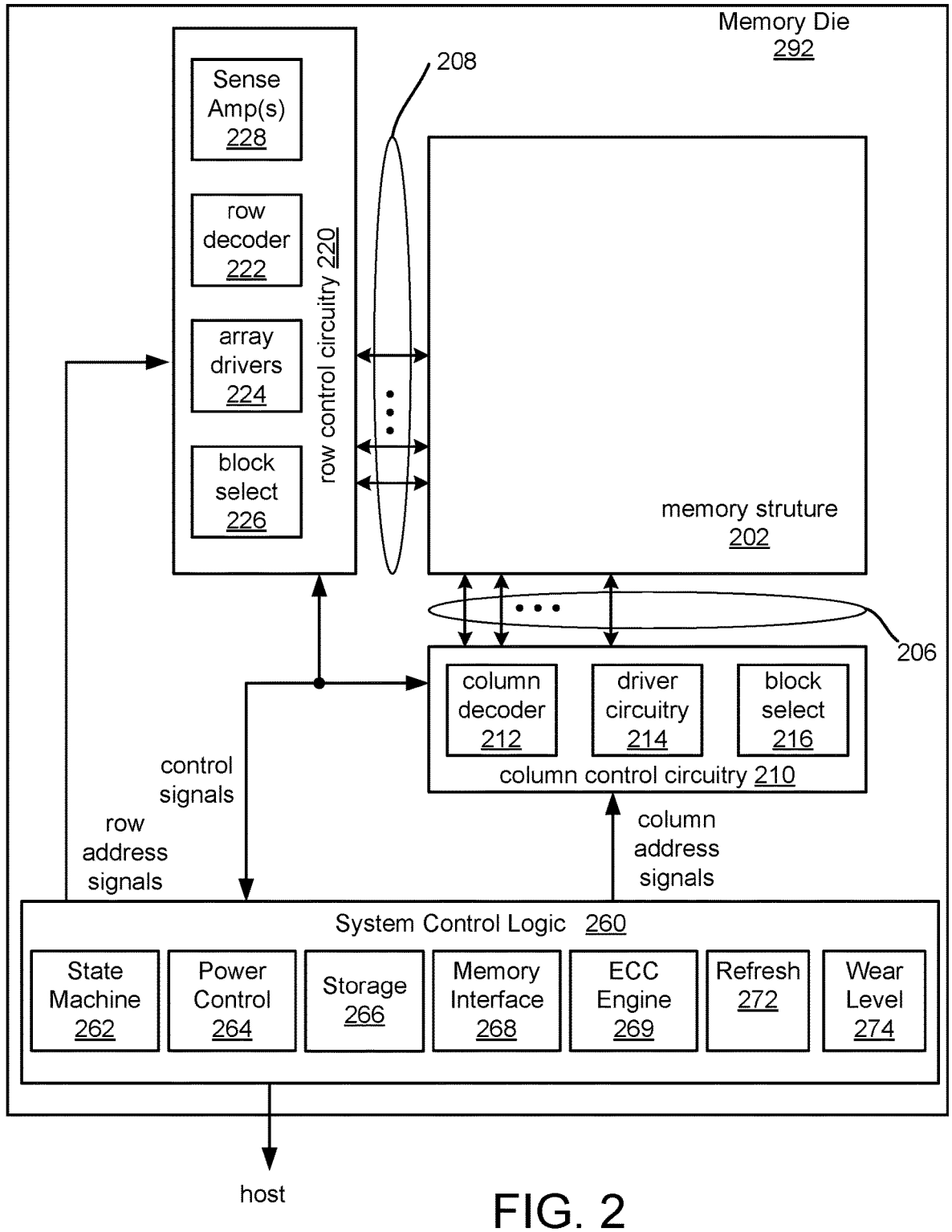
FIG. 2 is a block diagram of one embodiment of a memory die.

FIG. 2 is a block diagram that depicts one example of a memory die 292 that can implement the technology described herein. In one embodiment, memory die 292 is included in local memory 140, and in embodiment memory die 292 is included in memory 104. In one embodiment, memory die 292 is included in host memory 124. Memory die 292 includes a memory structure 202 that can include any of memory cells described in the following. The memory structure 202 may include one or more memory arrays. The array terminal lines of memory structure 202 include the various layer(s) of word lines organized as rows, and the various layer(s) of bit lines organized as columns. However, other orientations can also be implemented, including for example diagonal patterns to save space. Memory die 292 includes row control circuitry 220, whose outputs 208 are connected to respective word lines of the memory structure 202. Row control circuitry 220 receives a group of M row address signals and one or more various control signals from System Control Logic circuit 260, and typically may include such circuits as row decoders 222, row drivers 224, and block select circuitry 226 for both reading and writing operations. Row control circuitry 220 may also include read/write circuitry. In an embodiment, row decode and control circuitry 220 has sense amplifiers 228, which each contain circuitry for sensing a condition (e.g., voltage) of a word line of the memory structure 202. In an embodiment, by sensing a word line voltage, a condition or bit state of a memory cell in a cross-point array is determined, either directly by a sense amp comparing the accessed memory cell voltage with a reference voltage. Or less directly by first accessing the memory cell and storing a read voltage generated by forcing a read current through the cell and adjusting it up or down by 150 mv (or half the voltage difference resulting from changing the bit state), then writing the cell to AP state, and again accessing the memory cell with a read current and comparing the resulting voltage with the stored voltage adjusted 150 mV for example (or half the difference in voltage resulting from 2 different bit states. Memory die 292 also includes column decode and control circuitry 210 whose input/outputs 206 are connected to respective bit lines of the memory structure 202. Although only a single block is shown for memory structure 202, a memory die can include multiple arrays or "tiles" that can be individually accessed. Column control circuitry 210 receives a group of N column address signals and one or more various control signals from System Control Logic 260, and typically may include such circuits as column decoders 212, column decoders and drivers 214, block select circuitry 216, as well as read/write circuitry, and I/O multiplexers.

System control logic 260 receives data and commands from a host system and provides output data and status to the host system. In other embodiments, system control logic 260 receives data and commands from a separate controller circuit and provides output data to that controller circuit, with the controller circuit communicating with the host system. Such controller system may implement an interface such as DDR, DIMM, CXL, PCIe and others. In another embodiment those data and commands are sent and received directly from the memory packages to the Host without a separate controller, and any controller needed is within each die or within a die added to a multi-chip memory package. In some embodiments, the system control logic 260 can include a state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor. The system control logic 260 can also include a power control module 264 that controls the power, current source currents, and voltages supplied to the rows and columns of the memory structure 202 during memory operations and may include charge pumps and regulator circuit for creating regulating voltages, and on/off control of each for word line bit line selection of the memory cells. In some embodiments, the power control 264 includes one or more current sources. The current source(s) may be used to provide read and/or write currents. System control logic 260 includes storage 266, which may be used to store parameters for operating the memory structure 202. System control logic 260 also includes refresh logic 272 and wear leveling logic 274. Such system control logic may be commanded by the host 120 or memory controller 102 to refresh logic 272, which may load an on-chip stored row and column address (Pointer) which may be incremented after refresh. Such address bit(s) may be selected only (to refresh the OTS). Or such address may be read, corrected by steering through ECC engine 269, and then stored in a "spare" location, which is also being incremented (so all codewords are periodically read, corrected, and relocated in the entire chip under control of wear leveling logic 274) to in effect wear level so use of each bit across the chip is more uniform. Such operation may be more directly controlled by the host of an external controller, for example a PCIe or CXL or DDRn controller located separately from the memory chip or on the memory die.

Commands and data are transferred between memory controller 102 and the memory die 292 via memory controller interface 268 (also referred to as a "communication interface"). Such interface may be PCIe, CXL, DDRn for example. Memory controller interface 268 is an electrical interface for communicating with memory controller 102. Examples of memory controller interface 268 also include a Toggle Mode Interface. Other I/O interfaces can also be used. For example, memory controller interface 268 may implement a Toggle Mode Interface that connects to the Toggle Mode interfaces of memory interface 228/258 for memory controller 102. In one embodiment, memory controller interface 268 includes a set of input and/or output (I/O) pins that connect to the controller 102. In another embodiment, the interface is JEDEC standard DDRn or LPDDRn, such as DDR5 or LPDDR5, or a subset thereof with smaller page and/or relaxed timing.

System control logic 260 located in a controller on the memory die in the memory packages may include Error Correction Code (ECC) engine 269. ECC engine 269 may be referred to as an on-die ECC engine, as it is on the same semiconductor die as the memory cells. That is, the on-die ECC engine 269 may be used to encode data and parity bits that are to be stored in the memory structure 202, and to decode the decoded data and correct errors. The encoded data may be referred to herein as a codeword or as an ECC codeword. ECC engine 269 may be used to perform a decoding algorithm and to perform error correction. Hence, the ECC engine 269 may decode the ECC codeword. In an embodiment, the ECC engine 269 is able to decode the data more rapidly by direct decoding without iteration. Having the ECC engine 269 on the same die as the memory cells allows for faster decoding. The ECC engine 269 can use a wide variety of decoding algorithms including, but not limited to, Reed Solomon, a Bose-Chaudhuri-Hocquenghem (BCH), and low-density parity check (LDPC).

In some embodiments, all of the elements of memory die 292, including the system control logic 260, can be formed as part of a single die. In other embodiments, some or all of the system control logic 260 can be formed on a different die; e.g. external controller chip.

In one embodiment, memory structure 202 comprises a three-dimensional memory array of non-volatile or volatile memory cells in which multiple memory levels are formed above a single substrate, such as a wafer. The memory structure may comprise any type of non-volatile or volatile memory that are monolithically formed in one or more physical levels of memory cells having an active area disposed above a silicon or silicon on insulator (or other type of) substrate. In another embodiment, memory structure 202 comprises a two-dimensional memory array of non-volatile memory cells.

The exact type of memory array architecture or memory cell included in memory structure 202 is not limited to the examples above. Many different types of memory array architectures or memory technologies can be used to form memory structure 202. No particular non-volatile memory technology is required for purposes of the newly claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM or MRAM cross-point memory includes programmable resistance switching elements in series with an OTS selector arranged in cross-point arrays accessed by X lines and Y lines (e.g., word lines and bit lines). In another embodiment of cross-point is PCM in series with and OTS selector. In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive random access memory (MRAM) stores data using magnetic storage elements. The elements are formed from two ferromagnetic layers, each of which can hold a magnetization, separated by a thin insulating layer. For a field-controlled MRAM, one of the two layers is a permanent magnet set to a particular polarity; the other layer's magnetization can be changed by applying an external field to store memory. Other types of MRAM cells are possible. A memory device may be built from a grid of MRAM cells or as SOT magneto resistive memory. MRAM based memory embodiments will be discussed in more detail below.

Phase change memory (PCM) exploits the unique behavior of chalcogenide glass. One embodiment uses a GeTe—

Sb2Te3 super lattice to achieve non-thermal phase changes by simply changing the co-ordination state of the Germanium atoms with a laser pulse (or light pulse from another source). The memory cells are programmed by current pulses that can change the co-ordination of the PCM material or switch it between amorphous and crystalline states. Note that the use of "pulse" in this document does not require a square pulse but includes a (continuous or non-continuous) vibration or burst of sound, current, voltage, light, or other wave. And the current forced for write can, for example, be driven rapidly to a peak value and then linearly ramped lower with, for example, a 500 ns edge rate. Such peak current force may be limited by a zoned voltage compliance that varies by position of the memory cell along the word line or bit line. In an embodiment, a phase change memory cell has a phase change memory element in series with a threshold switching selector such as an OTS.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2 can be grouped into two parts, the memory structure 202 and the peripheral circuitry, including all of the other elements. An important characteristic of a memory circuit is its capacity, which can be increased by increasing the area of the memory die 292 that is given over to the memory structure 202; however, this reduces the area of the memory die available for the peripheral circuitry or increases cost which is related to chip area. This can place quite severe restrictions on these peripheral elements. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die 292 is the amount of area to devote to the memory structure 202 and the amount of area to devote to the peripheral circuitry. Such tradeoffs may result in more IR drop from use of larger x-y arrays of memory between driving circuits on the word line and bit line, which in turn may benefit more from use of voltage limit and zoning of the voltage compliance by memory cell position along the word line and bit line.

Another area in which the memory structure 202 and the peripheral circuitry are often at odds is in the processing involved in forming these regions, since these regions often involve differing processing technologies and the trade-off in having differing technologies on a single die. For example, elements such as sense amplifier circuits, charge pumps, logic elements in a state machine, and other peripheral circuitry in system control logic 260 often employ PMOS devices. In some cases, the memory structure will be based on CMOS devices. Processing operations for manufacturing a CMOS die will differ in many aspects from the processing operations optimized for NMOS-only technologies.

Figure 3:
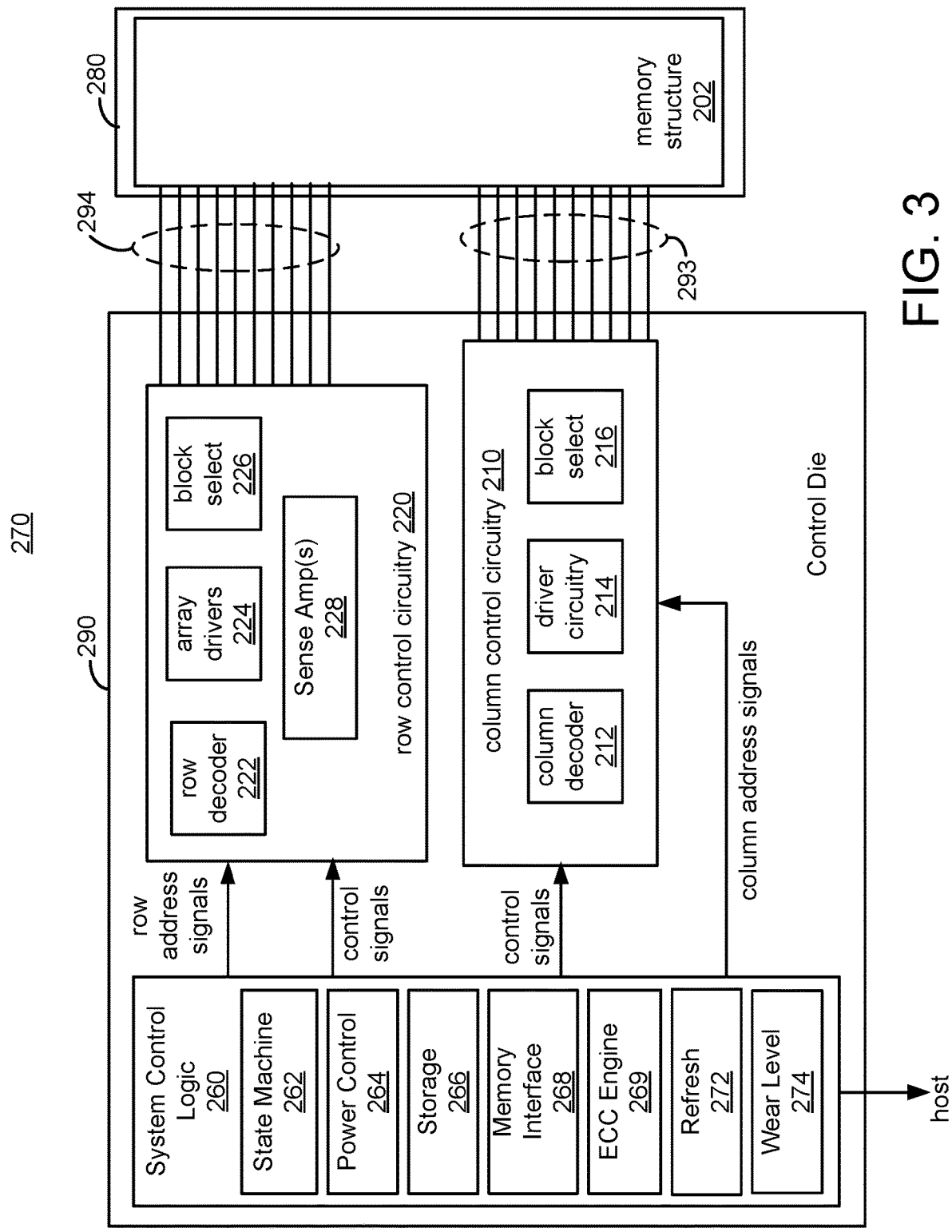
FIG. 3 is a block diagram of one embodiment of an integrated memory assembly containing a control die and a memory structure die.

To improve upon these limitations, embodiments described below can separate the elements of FIG. 2 onto separately formed die that are then bonded together. FIG. 3 depicts an integrated memory assembly 270 having a memory structure die 280 and a control die 290. The memory structure 202 is formed on the memory structure die 280 and some or all of the peripheral circuitry elements, including one or more control circuits, are formed on the control die 290. For example, a memory structure die 280 can be formed of just the memory elements, such as the array of memory cells of MRAM memory, PCM memory, ReRAM memory, or other memory type. Some or all of the peripheral circuitry, even including elements such as decoders, current sources, and sense amplifiers, can then be moved on to the control die. This allows each of the semiconductor die to be optimized individually according to its technology. This allows more space for the peripheral elements, which can now incorporate additional capabilities that could not be readily incorporated were they restricted to the margins of the same die holding the memory cell array. The two die can then be bonded together in a bonded multi-die integrated memory assembly, with the array on the one die connected to the periphery elements on the other die. Although the following will focus on an integrated memory assembly of one memory die and one control die, other embodiments can use additional die, such as two memory die and one control die, for example.

As with memory die 292 of FIG. 2, the memory structure die 280 in FIG. 3 includes a memory structure 202 that can include multiple independently accessible arrays or "tiles." System control logic 260, row control circuitry 220, and column control circuitry 210 are located in control die 290. In some embodiments, all or a portion of the column control circuitry 210 and all or a portion of the row control circuitry 220 are located on the memory structure die 280. In some embodiments, some of the circuitry in the system control logic 260 is located on the on the memory structure die 280.

FIG. 3 shows column control circuitry 210 on the control die 290 coupled to memory structure 202 on the memory structure die 280 through electrical paths 293. For example, electrical paths 293 may provide electrical connection between column decoder 212, column driver circuitry 214, and block select 216 and bit lines of memory structure 202. Electrical paths may extend from column control circuitry 210 in control die 290 through pads on control die 290 that are bonded to corresponding pads of the memory structure die 280, which are connected to bit lines of memory structure 202. Each bit line of memory structure 202 may have a corresponding electrical path in electrical paths 293, including a pair of bond pads, which connects to column control circuitry 210. Similarly, row control circuitry 220, including row decoder 222, row drivers 224, block select 226, and sense amplifiers 228 are coupled to memory structure 202 through electrical paths 294. Each of electrical path 294 may correspond to, for example, a word line. Additional electrical paths may also be provided between control die 290 and memory structure die 280.

For purposes of this document, the phrase "a control circuit" can include one or more of memory controller 102, local memory controller 164, processor 156, system control logic 260, column control circuitry 210, row control circuitry 220, host processor 122, a micro-controller, a state machine, and/or other control circuitry, or other analogous circuits that are used to control non-volatile memory. The control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit. Such control circuitry may include drivers such as direct drive via connection of a node through fully on transistors (gate to the power supply) driving to a fixed voltage such as a power supply. Such control circuitry may include a current source driver.

For purposes of this document, the term "apparatus" can include, but is not limited to, one or more of memory system 100, local memory 140, the combination of local memory controller 164 and/or memory controller 102 and local memory 140, memory package 104, memory die 292, integrated memory assembly 270, and/or control die 290.

In the following discussion, the memory structure 202 of FIGS. 2 and 3 will be discussed in the context of a cross-point architecture. In a cross-point architecture, a first set of conductive lines or wires, such as word lines, run in a first direction relative to the underlying substrate and a second set of conductive lines or wires, such a bit lines, run in a second direction relative to the underlying substrate. The memory cells are sited at the intersection of the word lines and bit lines. The memory cells at these cross-points can be formed according to any of a number of technologies, including those described above. The following discussion will mainly focus on embodiments based on a cross-point architecture using MRAM memory cells, each in series with a threshold switching selector such as Ovonic Threshold Switch (OTS) to comprise a selectable memory bit. However, embodiments are not limited to providing currents to a cross-point architecture having MRAM cells, each with magnetic memory element in a series OTS selector.

Figure 4A:
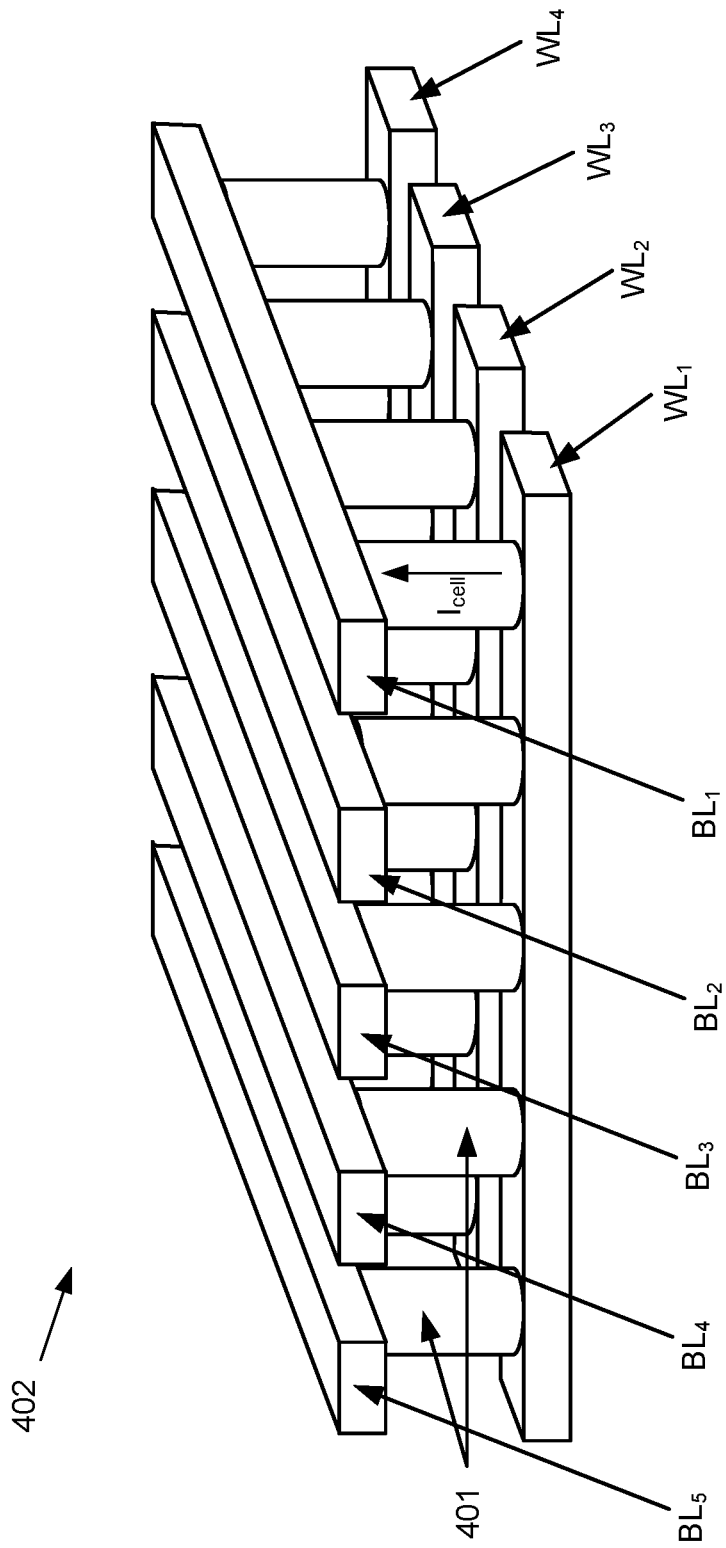
FIG. 4A depicts one embodiment of a portion of a memory array that forms a cross-point architecture in an oblique view.

FIG. 4A depicts one embodiment of a portion of a memory array 402 that forms a cross-point architecture in an oblique view. Memory array 402 of FIG. 4A is one example of an implementation for memory structure 202 in FIG. 2 or 3, where a memory die 292 or memory structure die 280 can include multiple such memory arrays 402. The memory array 402 may be included in local memory 140 or host memory 124. The bit lines $BL_1$-$BL_5$ are arranged in a first direction (represented as running into the page) relative to an underlying substrate (not shown) of the die and the word lines $WL_1$-$WL_5$ are arranged in a second direction perpendicular to the first direction, or diagonal to provide intersections where memory cells are interconnected between WLs and BLs. FIG. 4A is an example of a horizontal cross-point structure in which word lines $WL_1$-$WL_5$ and $BL_1$-$BL_5$ both run in a horizontal direction relative to the substrate, while the memory cells, two of which are indicated at 401, are oriented so that the current through a memory cell (such as shown at Icell) runs in the vertical direction. In a memory array with additional layers of memory cells, such as discussed below with respect to FIG. 4D, there would be corresponding additional layers of bit lines and word lines. One pattern, for example, would be from the bottom layer: WL, memory cell, BL, memory cell, WL, WL, memory cell, BL memory cell, WL.

As depicted in FIG. 4A, memory array 402 includes a plurality of memory cells 401. The memory cells 401 may include re-writeable memory elements, such as can be implemented using ReRAM, MRAM, PCM, or other material with a programmable resistance. The memory cells 401 may be referred to herein as programmable resistance memory cells. One type of programmable resistance memory cell is referred to as an MRAM cell, which is a memory cell that includes a MRAM memory element. The memory cells 401 may also include threshold switching selectors as an additional series element within the memory cells 401, such as can be implemented using an Ovonic Threshold Switch (OTS), Volatile Conductive Bridge (VCB), Metal-Insulator-Metal (MIM), or other material that provides a highly non-linear dependence of current or resistance for varying select voltage. The following discussion will focus on memory cells composed of an MRAM memory elements combined in series with an Ovonic Threshold switch elements, although much of the discussion can be applied more generally. The current in the memory cells of the first memory level is shown as flowing upward as indicated by arrow Icell, but current can flow in either direction to either read or write the memory cell bit state, as is discussed in more detail in the following.

Figure 4B:
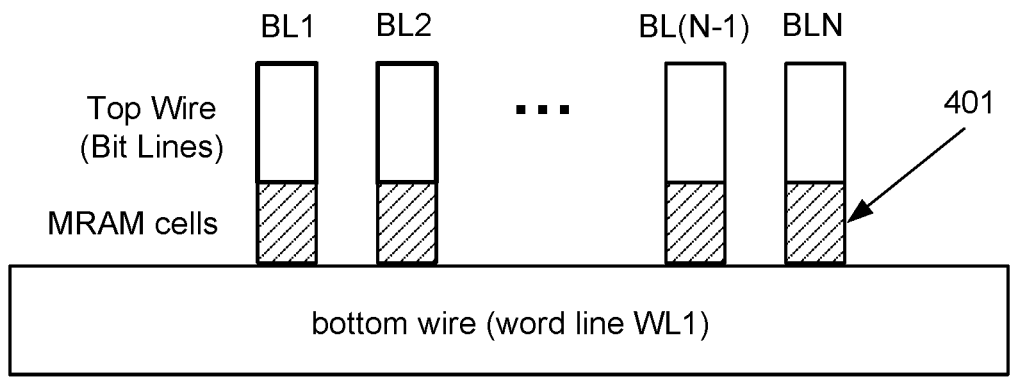
FIGS. 4B and 4C respectively present side and top views of the cross-point structure in FIG. 4A.
Figure 4C:
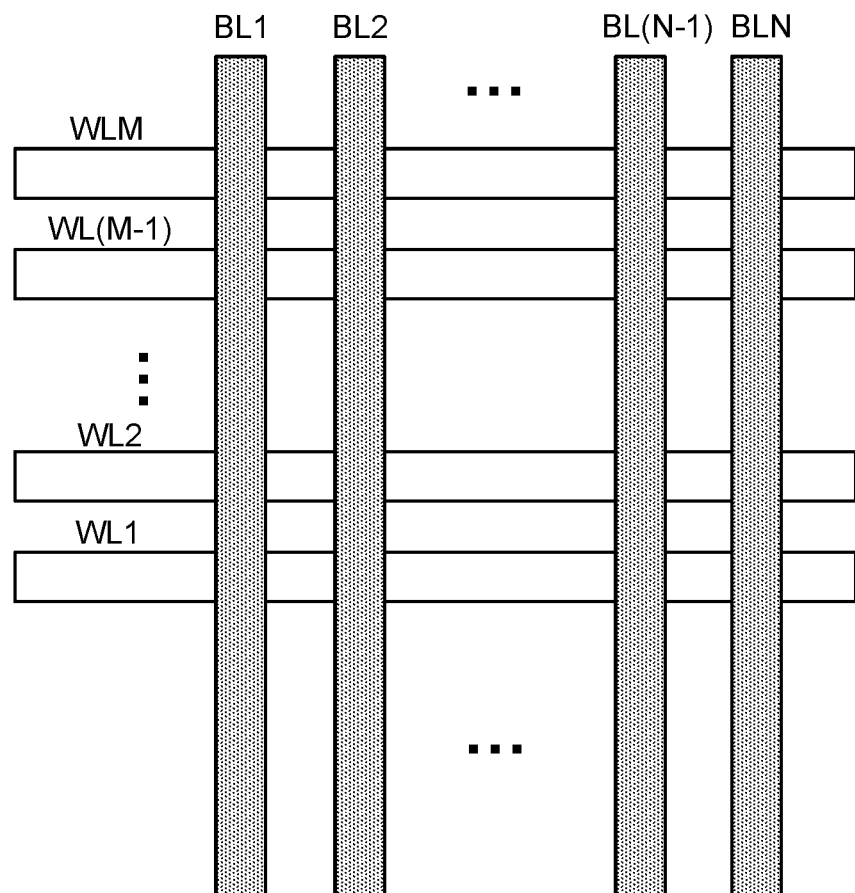

FIGS. 4B and 4C respectively present side and top views of the cross-point structure in FIG. 4A. The sideview of FIG. 4B shows one bottom wire, or word line, $WL_1$ and the top wires, or bit lines, $BL_1$-$BL_n$. At the cross-point between each top wire and bottom wire is an MRAM memory cell 401, although PCM, ReRAM, FeRAM, or other technologies can be used as the memory element. FIG. 4C is a top view illustrating the cross-point structure for M bottom wires $WL_1$-$WL_M$ and N top wires $BL_1$-$BL_N$. In a binary embodiment, the MRAM cell at each cross-point can be programmed into one of two resistance states: high and low. More detail on embodiments for an MRAM memory cell design and techniques for their reading are given below. In some embodiments, sets of these wires are arrayed continuously as a "tile," and such tiles may be paired adjacently in the Word Line (WL) direction and orthogonally in the Bit Line direction to create a module. Such a module may be composed of 2×2 tiles to form a four tile combination wherein the WL drivers between the tiles is "center driven" between the tiles with the WL running continuously over the transistor driver at the approximate center of the line. Similarly, BL drivers may be located between the pair of tiles paired in the BL direction to be center driven, whereby the transistor driver and its area is shared between a pair of tiles. Vias of copper or other types of low resistance may decode and connect the transistor driver/selects to the WL or BL. In addition to the memory element in the memory cell between WL and BL may also be included a series select element such as an OTS.

The cross-point array of FIG. 4A illustrates an embodiment with one layer of word lines and bits lines, with the MRAM or other memory technology for the memory cells sited at the intersection of the two sets of conducting lines. To increase the storage density of a memory die, multiple layers of such memory cells and conductive lines can be formed. A two-layer example is illustrated in FIG. 4D.

Figure 4D:
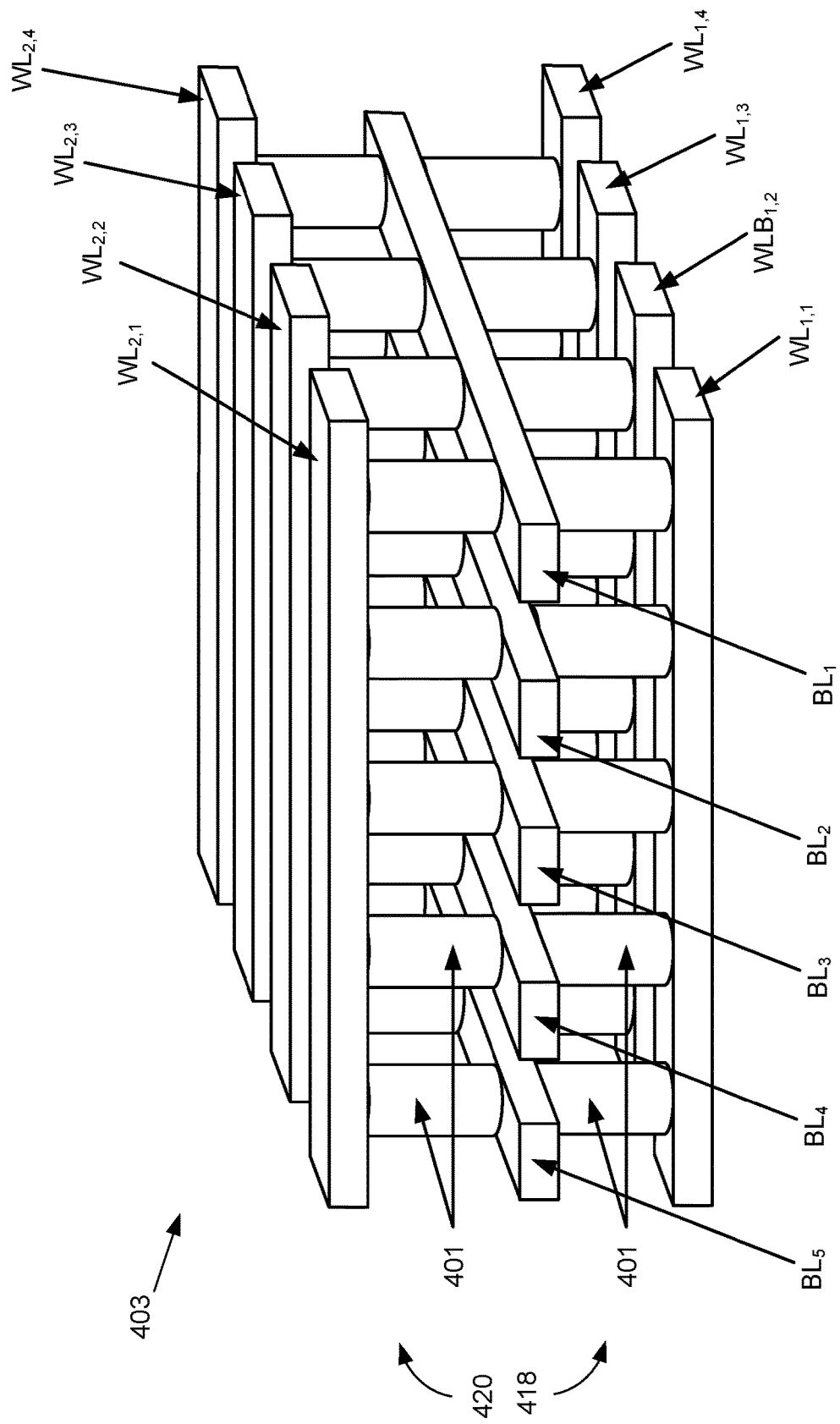
FIG. 4D depicts an embodiment of a portion of a two-level memory array that forms a cross-point architecture in an oblique view.

FIG. 4D depicts an embodiment of a portion of a two-level memory array that forms a cross-point architecture in an oblique view. As in FIG. 4A, FIG. 4D shows a first layer 418 of memory cells 401 of a memory array 403 connected at the cross-points of the first layer of word lines $WL_{1,1}$-$WL_{1,4}$ and bit lines $BL_1$-$BL_5$ above. Memory array 403 may be included in memory structure 202 of FIG. 2 or 3. A second layer 420 of memory cells is formed above the bit lines $BL_1$-$BL_5$ and between these bit lines and a second set of word lines $WL_{2,1}$-$WL_{2,4}$. In effect the BLs are shared. In the alternative a second layer may include another deck of BL above the BL shown and below the 2nd deck of WL. Although FIG. 4D shows two layers, 418 and 420, of memory cells, the structure can be extended upward through additional alternating layers of word lines and bit lines in a similar pattern. Depending on the embodiment, the word lines and bit lines of the array of FIG. 4D can be biased for read or program operations such that current in each layer flows from the word line layer to the bit line layer or the other way around. The two layers can be structured to have current flow in the same direction in each layer for a given operation or to have current flow in the opposite directions by driver selection in the positive or negative direction. The memory cell may be placed in the same orientation within the first and second layers enabling use of current in oppositive directions by layer to read or write. Or the memory cell placed in a reversed or flipped direction when placed between the BL and WL in the second layer (enabling use of current in the same direction as is used to read or write in memory cells within the first layer.

The use of a cross-point architecture allows for arrays with a small footprint and several such arrays can be formed on a single die. The memory cells formed at each cross-point can be a resistive type of memory cell, where data values are encoded as different resistance levels, either two levels such as with MRAM or into two or more levels for other memory element technologies such as PCM. Depending on the embodiment, the memory cells can be binary valued, having either a low resistance state or a high resistance state, or multi-level cells (MLCs) that can have additional resistance intermediate to the low resistance state and high resistance state. The cross-point arrays described here can be used in the memory die 292 of FIG. 2, the local memory 140 in FIG. 1, and/or the host memory 124 in FIG. 1, or in any other configuration where additional memory is useful. Resistive type memory cells can be formed according to many of the technologies mentioned above, such as ReRAM, PCM, FeRAM, or MRAM. The following discussion is presented mainly in the context of memory arrays using a cross-point architecture with binary valued MRAM memory cells, although much of the discussion is more generally applicable to other memory elements in memory cells within a cross-point array or other configurations apparent to those reasonably skilled in the art.

Figure 5:
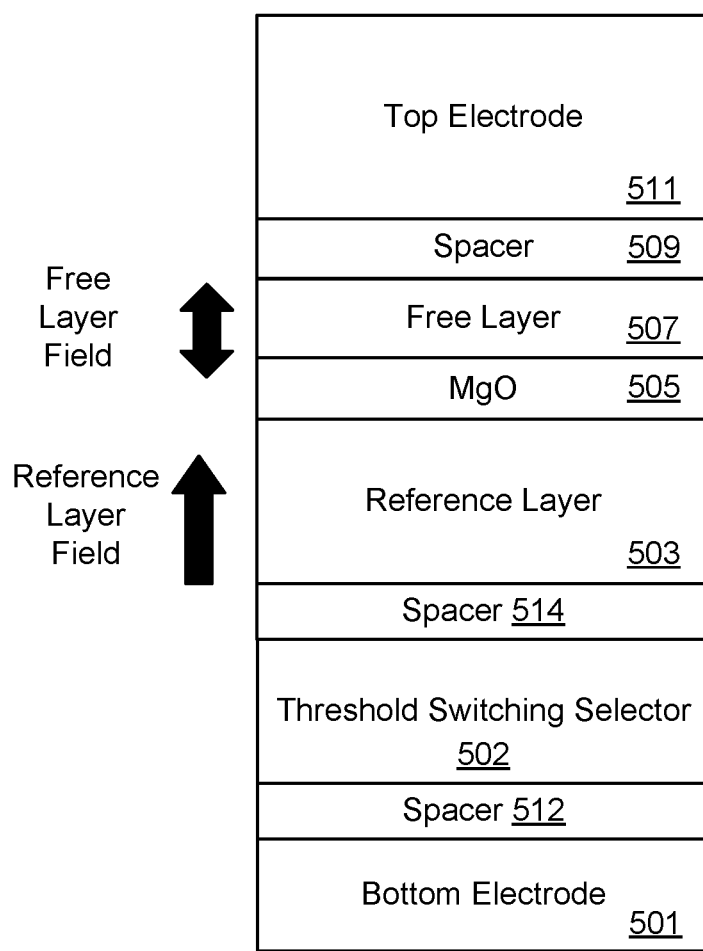
FIG. 5 illustrates an embodiment for the structure of an MRAM memory cell, here for example the selected cell is driven by a current source to read or write.

FIG. 5 illustrates the structure of an embodiment for an MRAM cell. The MRAM cell may be used as the programmable resistance memory cell 401 in, for example, FIGS. 4A-4D. The MRAM cell includes a bottom electrode 501, spacer 512, a threshold switching selector 502, spacer 514, a pair of magnetic layers (reference layer 503 and free layer 507) separated by a separation or tunneling layer of, in this example, magnesium oxide (MgO) 505, and then a top electrode 511 separated from the free layer 507 by a spacer 509. The spacer 509 can consist of an MgO capping layer in contact with the free layer 507. The spacer 509 can also contain additional metal layers. In another embodiment, the locations of the reference layer 503 and free layer 507 are switched, with the reference layer 503 on top of MgO 505, and the free layer 507 below MgO 505. In another embodiment, the location of the threshold switching selector 502 is between the free layer 507 and the top electrode 511.

In some embodiments, the bottom electrode 501 is a word line and the top electrode 511 is a bit line. In other embodiments, the bottom electrode 501 is a bit line and the top electrode 511 is a word line. The state of the memory cell is based on the relative orientation of the magnetizations of the reference layer 503 and the free layer 507: if the two layers are magnetized in the same direction, the memory cell will be in a parallel (P) low resistance state (LRS); and if they have the opposite orientation, the memory cell will be in an anti-parallel (AP) high resistance state (HRS). An MLC embodiment would include additional intermediate states. The orientation of the reference layer 503 is fixed and, in the example of FIG. 5, is oriented upward. Reference layer 503 is also known as a fixed layer or pinned layer. The reference layer 503 can be composed of multiple ferromagnetic layers coupled anti-ferromagnetically in a structure commonly referred to a synthetic anti-ferromagnet or SAF for short.

Data is written to an MRAM memory cell by programming the free layer 507 to either have the same orientation or opposite orientation of the reference layer 503. An array of MRAM memory cells may be placed in an initial, or erased, state by setting all of the MRAM memory cells to be in the low resistance state in which all of their free layers have a magnetic field orientation that is the same as their reference layers. Each of the memory cells is then selectively programmed (also referred to as "written") by placing its free layer 507 to be in the high resistance state by reversing the magnetic field to be opposite that of the reference layer 503. The reference layer 503 is formed so that it will maintain its orientation when programming the free layer 507. The reference layer 503 can have a more complicated design that includes synthetic anti-ferromagnetic layers and additional reference layers. For simplicity, the figures and discussion omit these additional layers and focus only on the fixed magnetic layer primarily responsible for tunneling magnetoresistance in the cell.

The threshold switching selector 502 has a high resistance (in an off or non-conductive state) until it is biased to a voltage higher than its threshold voltage or current above its threshold current, and until its voltage bias falls below Vhold ("Voffset") or current below Ihold. After Vt is exceeded and while Vhold is exceeded across the switching selector, the switching selector has a low resistance (in an on or conductive state). The threshold switching selector remains on until its current is lowered below a holding current Ihold, or the voltage is lowered below a holding voltage, Vhold. When this occurs, the threshold switching selector returns to the off (higher) resistance state. Accordingly, to program a memory cell at a cross-point, a voltage is applied which is sufficient to turn on the associated threshold switching selector and set or reset the memory cell; and to read a memory cell, the threshold switching selector similarly is activated by being turned on before the resistance state of the memory cell is determined. One set of examples for a threshold switching selector is an ovonic threshold switching material of an Ovonic Threshold Switch (OTS). Example threshold switching materials include Ge—Se, Ge—Se—N, Ge—Se—As, Ge—Se—Sb—N, Ge58Se42, GeTe$_6$, Si—Te, Zn—Te, C—Te, B—Te, Ge—As—Te—Si—N, Ge—As—Se—Te—Si and Ge—Se—As—Te, with atomic percentages ranging from a few percent to more than 90 percent for each element. In an embodiment, the threshold switching selector is a two terminal device. The threshold switching selector 502 can also contain additional conducting layers on the interface with the reference layer 503. For example, spacer 514 is depicted between switching selector 502 and reference layer 503. The spacer layer 514 on the interface with reference layer 503 can be a single conducting layer or composed of multiple conducting layers. The threshold switching selector 502 can also contain additional conducting layers on the interface with the bottom electrode 501. For example, spacer 512 is depicted between switching selector 502 and reference layer 503. The spacer layer 512 on the interface with bottom electrode 501 can be a single conducting layer or composed of multiple conducting layers. Examples of conducting layers adjacent to the OTS include carbon, carbon nitride, carbon silicide, carbon tungsten, titanium, titanium nitride, tungsten, tungsten nitride, tantalum, tantalum nitride, and others. Threshold voltage switches have a Threshold Voltage (Vt) above which the resistance of the device changes substantially from insulating, or quasi insulating, to conducting.

In an embodiment, a current-force approach is used to access the MRAM cell. The current-force approach may be used to read or write the MRAM cell. In the current-force approach, an access current (e.g., Iread or Iwrite) is driven through the bottom electrode 501 by a current driver. The current will be provided by a transistor or resistor based current source. In an embodiment, the current driver may be a part of the address selected row driver circuitry (e.g., array drivers 224) for the electrode 501. However, alternatively the current driver may a part of the address selected column driver circuitry (e.g., driver circuitry 214) for the electrode 501. A voltage (e.g., $V_{select}$) is provided to the top electrode 511. Herein, the terms "read current" (Iread) and "write current" (Iwrite) will be used in connection with access currents that are driven through MRAM cells (or other programmable resistance cells). The write current may change the state of the MRAM cell. As an example, a write current of about 30 uA for 50 ns may be used for an MRAM cell with a Critical Dimension (CD) of approximately 20 nanometers with RA 10 $\Omega\mu m^2$ to switch the MRAM state from the P-state to the AP-state. Read currents may be about half the write current if applied for a limited time, such as <20 ns. A write current that flows in one direction through the MRAM cell will change an AP-state MRAM cell from the AP-state to the P-state. A write current that flows in the other direction, such as in the read direction, through the MRAM cell will change a P-state MRAM cell from the P-state to the AP-state. In general until the cell state is determined or a voltage level is captured and stored that correlates to the memory cell state, a read current will preferably be set low enough and the read duration short enough so as not to change the state of an MRAM cell from the P-state to the AP-state or from the AP-state to the P-state during read. Typically the write current required to switch the MRAM state from the P-state to the AP-state is larger in absolute magnitude than the write current required to switch the MRAM state from the AP-state to the P-state. Current magnitudes may be adjusted accordingly by write direction, or the current used for P to AP if a single magnitude is used.

In some embodiments, a read current may be applied in a P2AP direction or, alternatively, in an AP2P direction. In some embodiments, the MRAM cell is read by performing an SRR (self-referenced-read). In one embodiment, the SRR has a first read (Read1 in the P2AP direction), a first write (Write 1 to the AP-state), and a second read (Read2 in the P2AP direction). Then the original state of the cell may be restored by a second write (Write_Back to the P-state for bits initially in the P-state). Or in another embodiment, the SRR read current and write currents are reversed; for example when addressing the second layer with a memory cell oriented the same as in the first layer.

In an embodiment, the voltage level of the memory cell due to Read in the P2AP direction is sensed and stored, for example on a capacitor; or by conversion to digital bits by an Analog to Digital converter and the bits stored in memory, for example in SRAM until after use in Read2. The state stored on a capacitor can be adjusted, for example, 150 mv positive or negative by forcing a voltage on one terminal of a capacitor connected to the storage capacitor. Or the digital stored level can be adjusted by digitally adding or subtracting 150 mV to the stored bits. The 150 mV can be adjusted to be dependent on the typical bit resistance. For example, if the bit low resistance state is 25K ohms and the high resistance 50K, the difference is 25K. If the read current is 15 ua, the difference voltage between the states if 25K×15 ua=375 mV, making a choice of 150 mv acceptable but perhaps suggesting 187 mV may be more optimum, for example.

Although the foregoing describes reads in the P2AP direction and destructive writes to the AP-state (with write back after SRR to the P-state), in an alternative embodiment the first SRR has a first read (Read1 in the AP2P direction), a destructive write (Write 1) to the P-state and a second read (Read2) in the AP2P direction.

In one embodiment, the MRAM cell is read by applying, for example, approximately 0V to the top electrode 511 by turning on a transistor connected between 511 and a power supply, while driving a current of, for example, 15 micro-Amperes (uA) through the bottom electrode 501. This read current may flow from the bottom electrode 501 to the top electrode 511. Note that the read may be Read1 or Read2 in the P2AP direction. P2AP means current flows in the direction that would write the bit from P to AP or AP to AP. In some embodiments, data is written to the MRAM cell using a bipolar write operation. In one embodiment, the MRAM cell is written from the AP-state to the P-state by applying, for example, 3V to the top electrode 511, while driving a write current of, for example, −30 uA through the bottom electrode 501. This write current will flow from the top electrode 511 to the bottom electrode 501. In one embodiment, the MRAM cell is written from the P-state to the AP-state by applying, for example, 0V to the top electrode 511, while driving a current of, for example, 30 uA through the bottom electrode 501. This write current will flow from electrode 501 to the electrode 511.

As an alternative to the approach in FIG. 5, the select voltage can be applied to the bottom electrode 501 with the access current applied through the top electrode 511. In one such embodiment, the MRAM cell is read by applying, for example, 3V to the bottom electrode 501, while driving a read current of, for example, −15 µA through the top electrode 511. This read current may flow from the bottom electrode 501 to the top electrode 511.

In one embodiment, the MRAM cell is written from the AP-state to the P-state by applying, for example, −3V to the bottom electrode 501, while driving a write current of, for example, 30 µA through the top electrode 511. The electron current will flow from the bottom electrode 501 to the top electrode 511. In one embodiment, the MRAM cell is written from the P-state to the AP-state by applying, for example, 0V to the bottom electrode 501, while driving a current of, for example, −30 µA through the top electrode 511. The electron current will flow from the top electrode 511 to the bottom electrode 501. In this discussion it is also understood that the direction of the current polarity to switch the magnetization of the bit into the P or AP state can vary based on reference layer design and the location of the reference layer with respect to the free layer.

Some biasing techniques may result in voltage across non-selected memory cells of the array, which can induce currents in non-selected memory cells. Although this wasted power consumption can be mitigated to some degree by designing the memory cells to have relatively high resistance levels for both high and low resistance states when WL or BL is address unselected, this overhead leakage will still result in increased current and power consumption as well as placing additional design constraints on the design of the memory cells and the array. One approach to address this unwanted current leakage is to place a selector element in series with each MRAM or other resistive (e.g., ReRAM, PCM) memory cell. For example, a select transistor can be placed in series with each resistive memory cell element in FIGS. 4A-4D so that the memory cells 401 is now a composite of a select transistor and a programmable resistance. Such an architecture may be referred to as 1T1R. Use of a select transistor, however, requires the introduction of additional control lines and cell area to be able to turn on the corresponding transistor of a selected memory cell. Additionally, transistors will often not scale in the same manner as the resistive memory element write current, so that as memory arrays move to smaller sizes the use of transistor based selectors can be a limiting factor in reducing cost, for example. An alternate approach to select transistors is the use of a threshold switching selector (e.g., threshold switching selector 502) in series with the programmable resistive element. A two terminal threshold switching selector does not require the aforementioned additional control lines and additional cell area to be able to turn on the corresponding select transistor of a selected memory cell. In some embodiments, the memory system performs a read as disclosed herein to read memory cells having a two terminal threshold switching selector in series with a programmable resistance memory element.

Figure 6A:
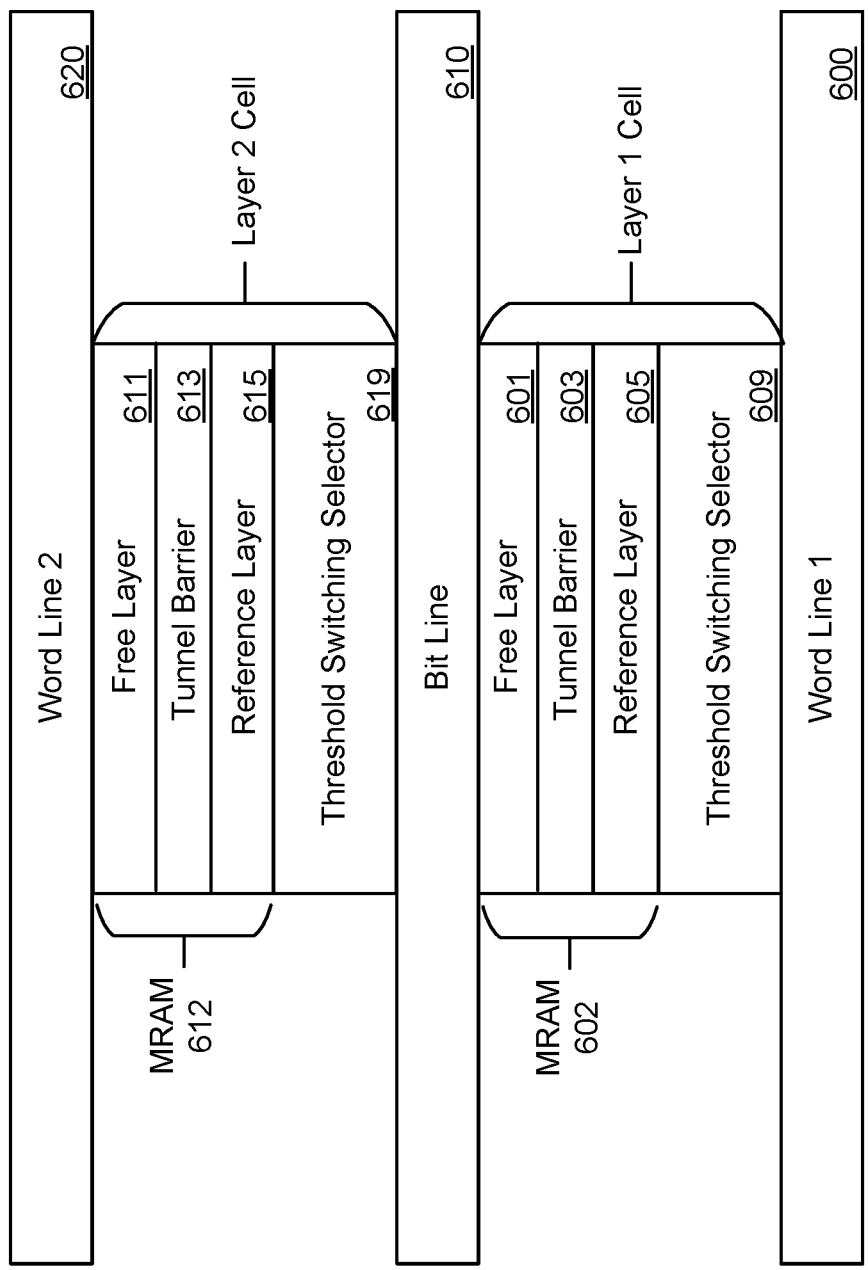
FIGS. 6A and 6B illustrate embodiments for the incorporation of threshold switching selectors into an MRAM memory array having a cross-point architecture.
Figure 6B:
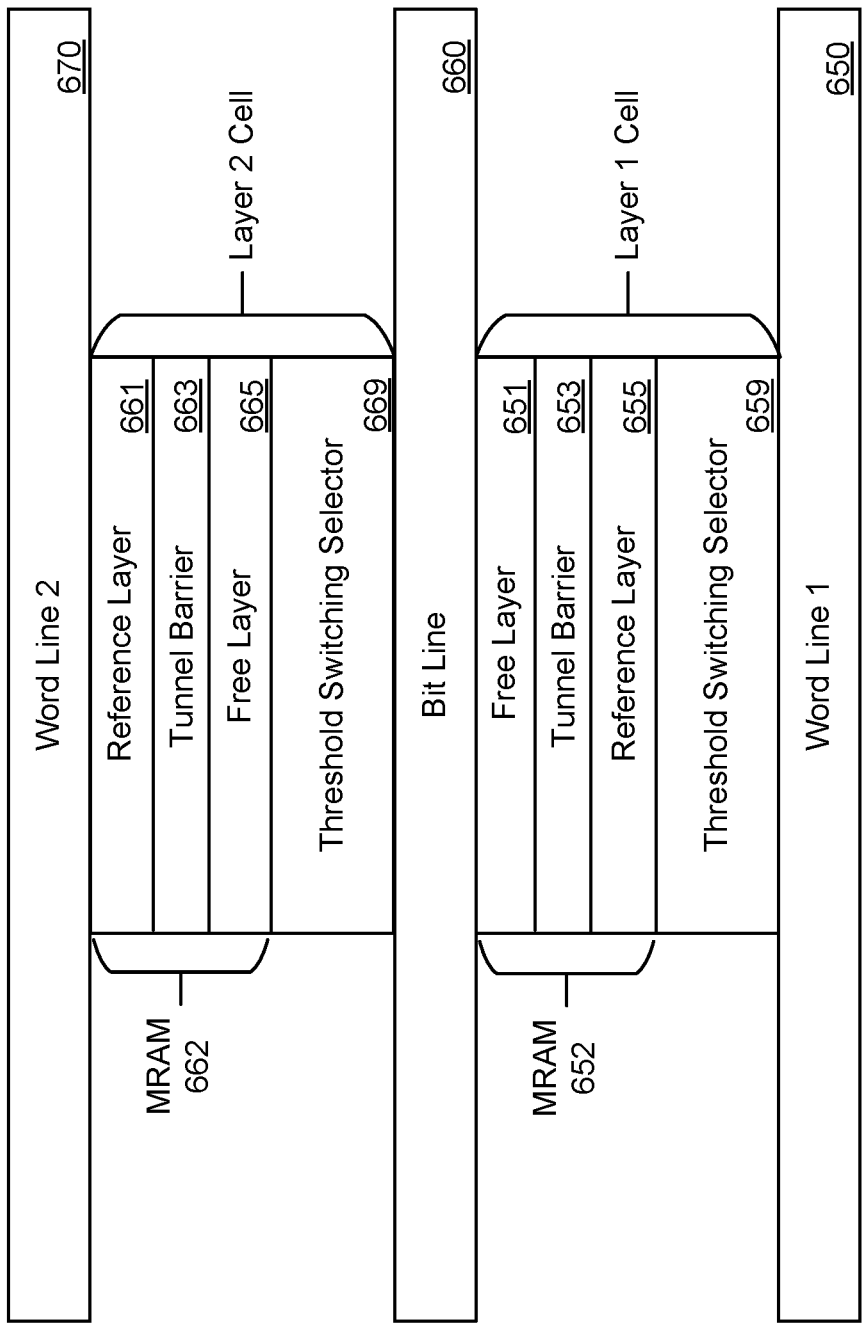

FIGS. 6A and 6B illustrate embodiments for the incorporation of threshold switching selectors into an MRAM memory array having a cross-point architecture. The examples of FIGS. 6A and 6B show two MRAM cells (Layer 1 Cell, Layer 2 Cell) in a two layer cross-point array, such as shown in FIG. 4D, but in a side view. Keeping the orientation of the MRAM layers the same in the Layer 1 Cell and the Layer 2 Cell, as depicted in FIG. 6A, allows the fabrication process to be the same for each layer. Whereas 6B has the memory cell inverted which allows the drive circuitry to work the same; e.g. BL goes Low to Read P2AP for each layer. FIGS. 6A and 6B show a lower first conducting line of word line 1 600, an upper first conducting line of word line 2 620, and an intermediate second conducting line of bit line 610. In these figures, all of these lines are shown running left to right across the page for ease of presentation, but in a cross-point array they would be more accurately represented as in the oblique view of FIG. 4D where the word lines, or first conducting lines or wires, run in one direction parallel to the surface of the underlying substrate and the bit lines, or second conducting lines or wires, run in a second direction parallel to the surface to the substrate that is largely orthogonal to the first direction. The MRAM memory cells are also represented in a simplified form, showing only the reference layer, free layer, and the intermediate tunnel barrier, but in an actual implementation would typically include the additional structure described above with respect to FIG. 5.

An MRAM element 602 including free layer 601, tunnel barrier 603, and reference layer 605 is formed above the threshold switching selector 609, where this series combination of the MRAM element 602 and the threshold switching selector 609 together form the layer 1 cell between the bit line 610 and word line 1 600. The series combination of the MRAM element 602 and the threshold switching selector 609 operate largely as described above when the threshold switching selector 609 is turned on. Initially, though, the threshold switching selector 609 needs to be turned on by applying a voltage above the threshold voltage $V_{th}$ of the threshold switching selector 609, and then the biasing current or voltage needs to be maintained high enough above the holding current or holding voltage of the threshold switching selector 609 so that it stays on during the subsequent read or write operation.

On the second layer, an MRAM element 612 includes free layer 611, tunnel barrier 613, and reference layer 615 is formed above the threshold switching selector 619, with the series combination of the MRAM element 612 and the threshold switching selector 619 together forming the layer 2 cell between the bit line 610 and word line 2 620. The layer 2 cell will operate as for the layer 1 cell, although the lower conductor now corresponds to a bit line 610 and the upper conductor is now a word line, word line 2 620. Additional paired layers may similarly share another bit line between them, having a pattern of WL1, BL1, WL2; WL3, BL2, WL4; or have separate bit lines in a pattern such as WL1, BL1, WL2, BL2. Or separate bit lines in a pattern of WL1, BL1, BL2, WL2.

In the embodiment of FIG. 6A, the threshold switching selector 609/619 is formed below the MRAM element 602/612, but in alternate embodiments the threshold switching selector can be formed above the MRAM element for one or both layers. The MRAM memory cell is directional. In FIG. 6A, the MRAM elements 602 and 612 have the same orientation, with the free layer 601/611 above (relative to the unshown substrate) the reference layer 605/615. Forming the layers between the conductive lines with the same structure can have a number of advantages, particularly with respect to processing as each of the two layers, as well as subsequent layers in embodiments with more layers, can be formed according to the same processing sequence.

FIG. 6B illustrates an alternate embodiment that is arranged similarly to that of FIG. 6A, except that in the layer 2 cell the locations of the reference layer and free layer are reversed. More specifically, between word line 1 650 and bit line 660, as in FIG. 6A the layer cell 1 includes an MRAM element I having a free layer 651 formed over tunnel barrier 653, that is turn formed over the reference layer 655, with the MRAM element 652 formed over the threshold switching selector 659. The second layer of the embodiment of FIG. 6B again has an MRAM element 662 formed over a threshold switching selector 669 between the bit line 660 and word line 2 670, but, relative to FIG. 6A, with the MRAM element 662 inverted, having the reference layer 661 now formed above the tunnel barrier 663 and the free layer 665 now under the tunnel barrier 663. Alternatively, the configuration of MRAM element 662 may be used for the Layer 1 cell and the configuration of MRAM cell 652 may be used for the Layer 2 cell.

Although the embodiment of FIG. 6B requires a different processing sequence for the forming of layers, in some embodiments it can have advantages. In particular, the directionality of the MRAM structure can make the embodiment of FIG. 6B attractive since when writing or reading in the same direction (with respect to the reference and free layers) the bit line will be biased the same for both the lower layer and the upper layer, and both word lines will be biased the same. For example, if both layer 1 and layer 2 memory cells are sensed in the P2AP direction (with respect to the reference and free layers), the bit line layer 660 will be biased such as in the P2AP direction, the bit line 660 is biased low (e.g., 0V) for both the upper and lower cell, with word line 1 650 and word line 2 670 both biased to a higher voltage level. Similarly, with respect to writing, for writing to the high resistance AP state the bit line 660 is biased low (e.g., 0V) for both the upper and lower cell, with word line 1 650 and word line 2 670 both biased to a higher voltage level.

To either read data from or write data to an MRAM memory cell involves passing a current through the memory cell. In embodiments where a threshold switching selector is placed in series with the MRAM element, before the current can pass through the MRAM element the threshold switching selector may be turned on by applying a sufficient voltage across and current through the series combination of the threshold switching selector and the MRAM element.

Figure 7:
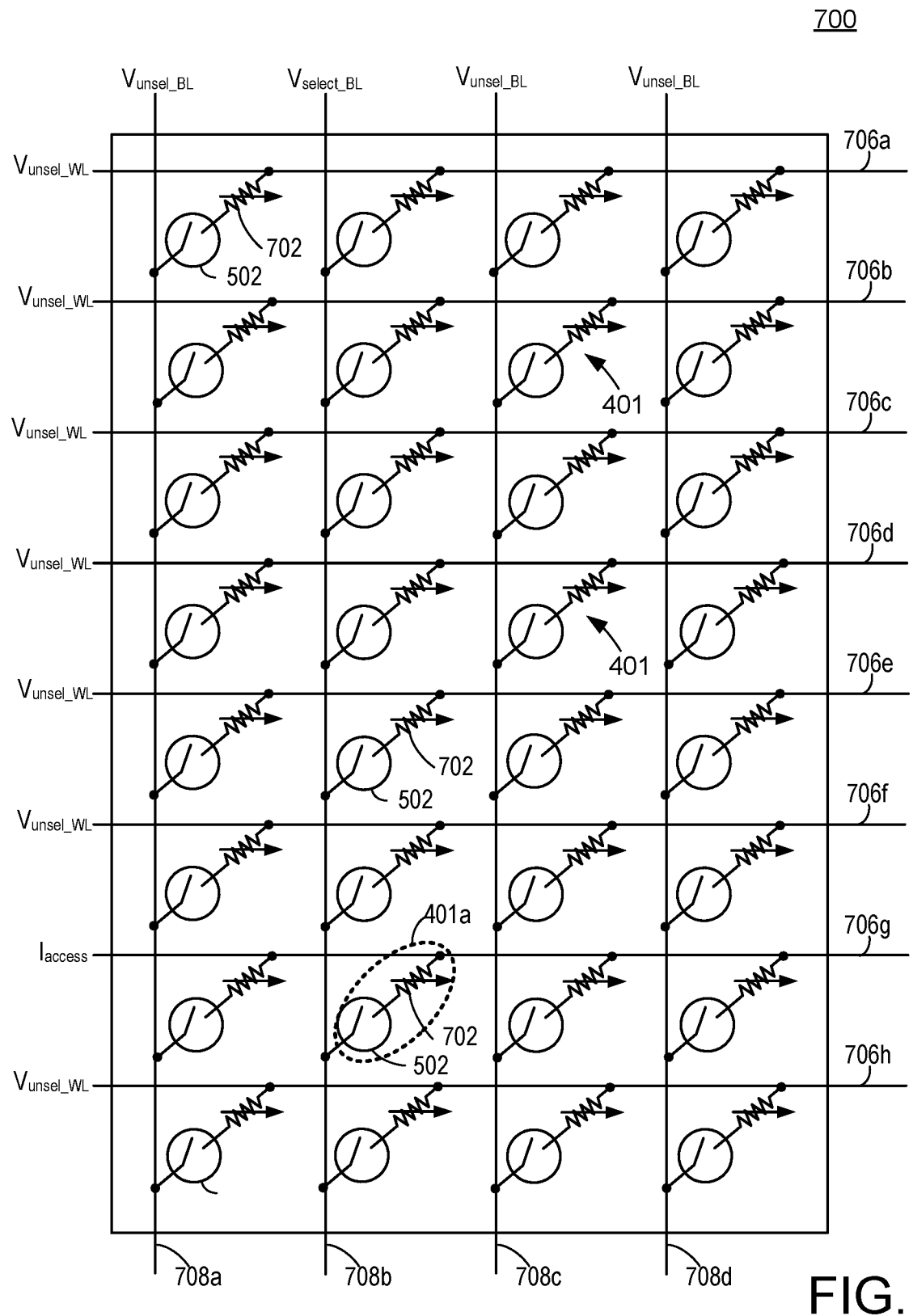
FIG. 7 depicts an embodiment of a memory array having a cross-point architecture that is accessed using a forced-current approach.

FIG. 7 depicts an embodiment of a memory array 700 having a cross-point architecture. The memory array 700 may be included in memory structure 202 of FIG. 2 or 3. The array 700 has a set of first conductive lines 706a-706h and a set of second conductive lines 708a-708d. In one embodiment, the set of first conductive lines 706a-706h are word lines and the set of second conductive lines 708a-708b are bit lines. For ease of discussion, the set of first conductive lines 706a-706h may be referred to as word lines and the set of second conductive lines 708a-708b may be referred to as bit lines. However, the set of first conductive lines 706a-706h could be bit lines and the set of second conductive lines 708a-708b could be word lines.

The memory array 700 has a number of programmable resistance memory cells 401. Each memory cell 401 is connected between one of the first conductive lines 706 and one of the second conductive lines 708. In one embodiment, each memory cell 401 has a magnetoresistive random access memory (MRAM) element in series with a threshold switching selector. The threshold switching selector 502 is configured to become conductive with lower resistance in response to application of a voltage level exceeding a threshold voltage of the threshold switching selector 502, and remains conductive with lower resistance until the current through the switching selector 502 is reduced below the selector holding current, Ihold. The threshold switching selector 502 may be a two terminal device. In an embodiment, the threshold switching selector 502 comprises an OTS.

For purpose of discussion, memory cell 401a is being selected for access. This could be a read or a write access. Selected memory cell 401a is at the cross-point of selected word line 706g and selected bit line 708b. A selected memory cell means a memory cell that is selected for a memory operation such as read or write. A selected memory cell is connected between a selected word line and a selected bit line. To select a memory cell 401, a select voltage ($V_{select\_BL}$) such as near ground is provided to the selected bit line (e.g., bit line 708b) and an access current ($I_{access}$) is driven (or forced) through a selected word line (e.g., word line 706g). A selected word line means that the word line is connected to at least one selected memory cell. The selected word line will typically be connected to one or more unselected memory cells. A selected bit line means that the bit line is connected to at least one selected memory cell. The selected bit line will typically be connected to one or more unselected memory cells.

In one embodiment, $V_{select\_BL}$ has an adequate magnitude such that the threshold switching selector 502 in a selected memory cell will turn on, assuming that $I_{access}$ is applied to the selected word line with adequate compliance voltage relative to the BL voltage. For example, $V_{select\_BL}$ may be approximately 0V. On the other hand, $V_{unsel\_BL}$ has a magnitude such that the threshold switching selector 502 in an unselected memory cell will not turn on, for example $V_{select\_BL}$ may be approximately 1.65V if the positive power supply is 3.3V. Access current ($I_{access}$) is driven through at least a portion of selected word line 706g. This access current may also flow through the selected memory cell 401a and in a portion of selected bit line 708b after the OTS is turned on. Such a selected WL may, for example, be driven high by 15 µa to read or 30 µa to write by a current source with compliance voltage of, for example, 3.3V. To write the opposite polarity, the selected word line is forced, for example, with −30 µa and the selected bit line to near 3.3V.

The other memory cells are not selected for access (i.e., are unselected memory cells). An unselected memory cell means that the memory cell is not presently selected for access (e.g., read or write). An unselected word line is connected only to unselected memory cells. An unselected bit line is connected only to unselected memory cells. Word lines and bit lines that are not selected are referred to as unselected word lines or unselected bit lines, respectively. In one embodiment, a word line or bit line may be unselected by forcing them to an unselect voltage, such as Vmid, for example 1.65V, at approximately one half the drive compliance voltage, for example 3.3V. An unselect voltage ($V_{unsel\_BL}$) is provided to the unselected bit lines (e.g., bit lines 708a, 708c, 708d). An unselect voltage ($V_{unsel\_WL}$) such as Vmid is provided to the unselected word lines (e.g., word lines 710a, 710b, 710c, 710d, 710e, 710f, and 710h). $I_{access}$ could flow in either direction through the selected word line (as well as the selected bit line). In one embodiment, no current other than leakage is forced through unselected word lines (e.g., 706a, 706b, 706c, 706d, 706e, 706f, and 706h).

In the example of FIG. 7 there are more word lines than bit lines in the cross-point array. In one embodiment, there are more bit lines than word lines in the cross-point array. In one embodiment, the number of bit lines equals the number of word lines in the cross-point array. In the example of FIG. 7 there are twice as many word lines as bit lines in the cross-point array; however, a different ratio could be used. Thereby, different tile sizes may be realized. For example, a tile may have 1024 BL by 2048 WL, which may be composed into a module of 2048×4096 cells by center driving the WL and BL between the four tiles. In one embodiment, read is performed on a group of memory cell by, for example, selecting one memory cell in each of a number of tiles. In some embodiments, more than one memory cell from a tile may be selected for read.

In some embodiments, a current-force approach is used to access memory cells in a cross-point memory array. Threshold switching selectors may be used in series with the memory cells. The threshold switching selector may be connected in series with the memory element between the word line and the bit line. Hence, any voltage across the switching selector will reduce the voltage across the memory element. Typically, there will be some variation in the offset or hold voltage between the switching selectors. A current-force approach may help to mitigate offset voltage variation between threshold switching selectors to help minimize the selected cell current variation cell to cell.

Figure 8:
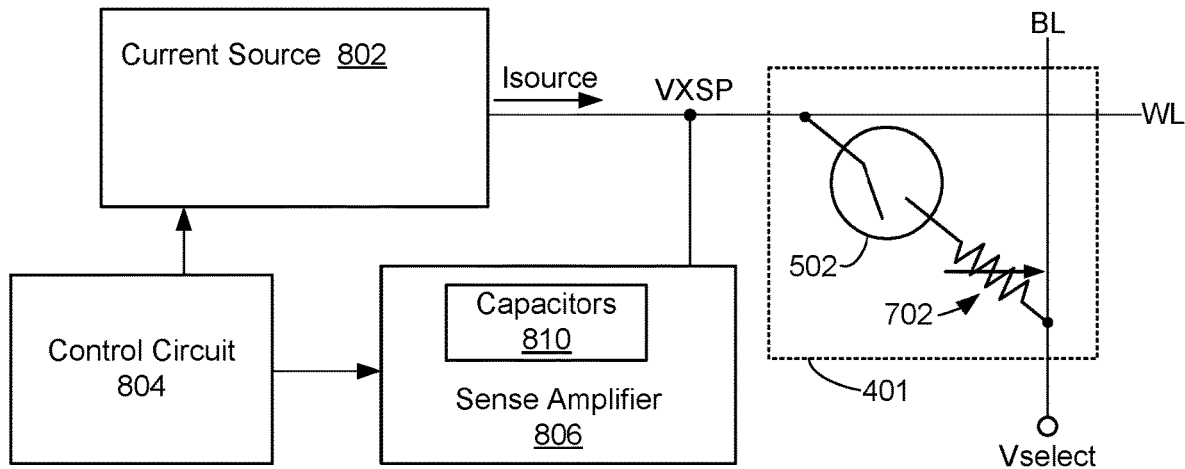
FIG. 8 is a diagram of one embodiment of a system for reading a memory cell having a threshold switching selector.

FIG. 8 is a diagram of one embodiment of a system for reading a memory cell having a threshold switching selector. The system has a current source 802, control circuit 804, and sense amplifier 806. The memory cell 401 has a programmable resistance memory element 702 in series with a threshold switching selector 502. In one embodiment, the memory cell 401 is an MRAM cell in which the programmable resistance memory element 702 is a magnetoresistance memory element and the threshold switching selector 502 is an OTS. However, the memory cell could be a PCM cell, a ReRam cell, etc. The threshold switching selector 502 is not required to be an OTS. The threshold switching selector 502 could instead be a Volatile Conductive Bridge (VCB), Metal-Insulator-Metal (MIM), or other material that provides a highly non-linear dependence of current on select voltage. The voltage Vselect on the bit line (BL) is a voltage having a suitable magnitude to select the memory cell, for example 0V. In one embodiment, Vselect to the bit line is near 3.3V, and near 0V in another embodiment.

The output of the current source 802 is connected to a node referred to as VXSP. The node VXSP is connectable to the word line via the address decoding transistors with source drain connected between VXSP and a word line, and gates connected to binary address signals. Such transistors may be p or n-channel. The system may have WL decoders used to select which word line is connected to the current source 802. Such WL decoders are not depicted in FIG. 8. The node VXSP is connectable to an input of the sense amplifier 806 and may therefore be referred to as a sense node. The current source 802 provides a current (Isource) to the selected word line. Note that the current source 802 may use different magnitude current generators for a read current and a write current. In an embodiment, the current source 802 provides a first write current to "set" the memory cell a second write current to "reset" the memory cell, wherein these two write currents have opposite polarities. During a read the current may charge up the selected word line until the threshold switching selector 502 switches on. After the threshold switching selector 502 switches on, Isource is driven through the memory cell 401 in the direction and magnitude designed for read and/or write.

The sense amplifier 806 (more briefly "sense amp") may be connected to node VXSP and may sense the memory cell 401 while Isource is driven through the memory cell 401. The sense amplifier 806 has a set of capacitors 810. In an embodiment, the sense amplifier includes a differential amp that is able to compare the voltage on VXSP with a reference voltage (e.g., Vref). In an embodiment, one of those capacitors in the sense amplifier 806 may be connected to node VXSP to sense and store a voltage on VXSP in order to sense the memory cell. In an embodiment, the capacitors 810 include one or more additional capacitors that may be connected to the node VXSP (and hence the selected word line) during the read operation. As will be explained in more detail below these one or more additional capacitors may be used to add or remove charge from node VXSP (and hence the selected word line). In one embodiment, a capacitor may be connected to node VXSP (and hence the selected word line) just after the threshold switching selector 502 switches on. Turn off the OTS occurs at Vth on the WL if the BL is near 0. Until turn-on, only leakage to unselected bits flows on the selecting WL and BL, and the read current charges the WL up to turn on the OTS, and then through the selected memory cell. Then, the voltage between the WL and BL collapses from Vth to Voffset plus Iread×path resistance from VXSP to ground (as described later, such as select transistors T1+T3 to WL and T1+T3 to BL and memory cell resistance and voltage (mram+ots) and drive transistor driving from ground into bit line T1+T3. Any difference voltage is discharged through the memory cell and other loads. This capacitor is a load that may be pre-charged to a lower voltage and thereby remove charge from node VXSP (and hence the selected word line) when transistor connected to VXSP. The removal of the charge from node VXSP (and hence the selected word line) may prevent an undesirable current flow in excess of Iread flowing in the memory element 702, thereby helping avoid the memory element 702 changing its state prior to sensing the voltage on the memory element 702 after it stabilizes after address selection and OTS turn-on. Another benefit of removal of the charge from node VXSP (and hence the selected word line) just after the threshold switching selector 502 switches on is to speed the rate at which the selected word line drops to a stable voltage, thereby reducing read latency in the sensing read operation, or decreasing time to establish the write voltage during write.

The capacitors 810 may be used in a globally referenced read (also referred to as a mid-point read) or an SRR. In one embodiment of a SRR one of the capacitors is used to provide charge to node VXSP (and hence the selected word line) to speed the rate of charging the word line to a write voltage. This write could be for a destructive write that is between Read1 and Read2 or a write back that is used to restore the original state of the memory element 702 if needed. In one embodiment of a SRR, one of the capacitors is used to discharge node VXSP (and hence the selected word line) after the current from the current source 802 is lowered from a write current to a read current. Therefore, such as capacitor may be used to speed the rate at which the selected word line is discharged such that Read2 can be performed sooner, thereby reducing the read latency.

Figure 9:
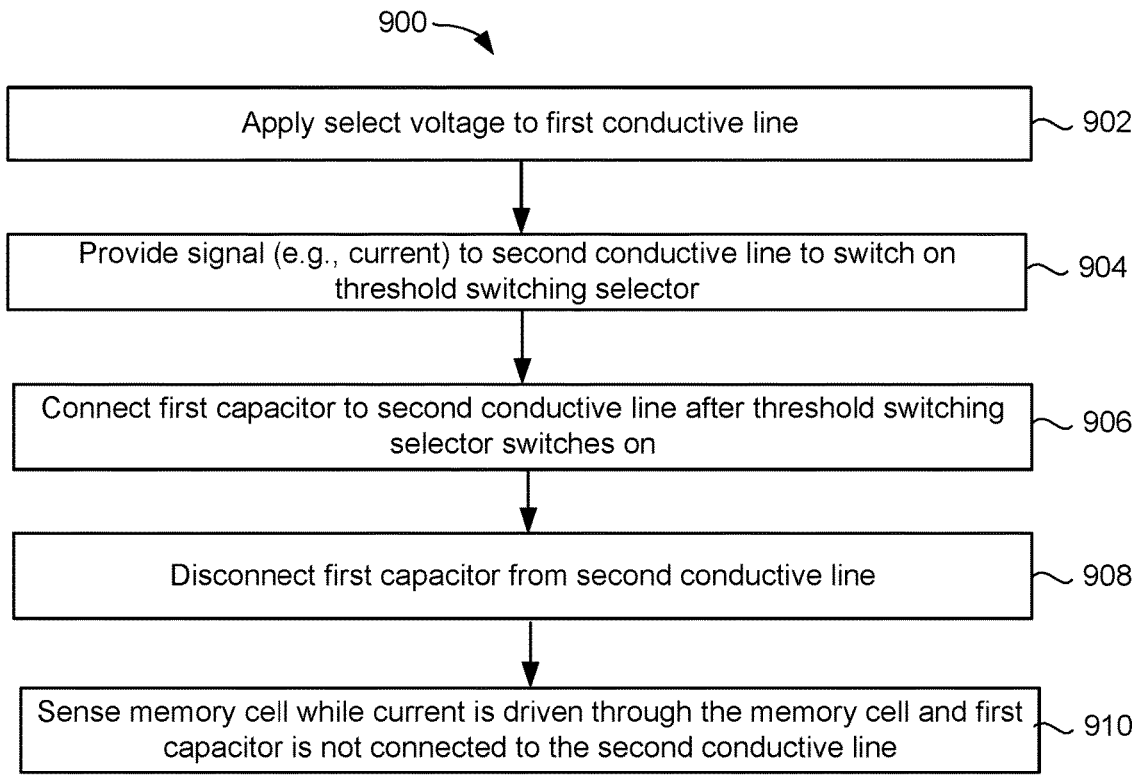
FIG. 9 is a flowchart of one embodiment of a process of reading programmable resistance memory cells in a cross-point array.

FIG. 9 is a flowchart of one embodiment of a process 900 of reading programmable resistance memory cells in a cross-point array. The process may be used to read memory cells having a threshold switching selector 502, such as but not limited to an OTS. The process 900 may reduce read latency. The process 900 may improve read accuracy (bit error rate) by preventing the memory cell from inadvertently flipping its state prior to sensing the cell. In one embodiment, process 900 is used in a midpoint read. In one embodiment, process 900 is used in an SRR.

Step 902 includes applying a select voltage to a first conductive line. For example, the control circuit 804 provides a select voltage to the bit line. As one example, the bit line may be grounded to select the bit line; however, other voltages could be used. Step 902 may include applying voltages to a global and/or local bit line decoder based on the address of the selected memory cell.

Step 904 includes providing a signal (e.g., current) to a second conductive line to switch on the threshold switching selector 502. For example, the control circuit 804 controls the current source 802 to apply Isource to the word line. The control circuit 804 may control the magnitude of the current by selecting which current to apply from the current source 802. Step 902 may include applying voltages to a global and/or local word line decoder based on the address of the selected memory cell.

Step 906 includes connecting a first capacitor of a sense amp 806 to the second conductive line after the threshold switching selector 502 has switched on. Step 906 may include connecting the first capacitor to the sense node VXSP, which is connected to the word line, to thereby connect the first capacitor to the word line. The threshold switching selector 502 may have a high resistance prior to turning on; however, the resistance may drop quickly when the threshold switching selector 502 turns on. The rapid drop in resistance may result in what may be referred to as "excess charge" at node VXSP and/or the word line. The excess charge could potentially flow in the memory element 702, which could potentially change the state of the memory element 702, thereby leading to a read error. In an embodiment, the excess charge is transferred from node VXSP and/or the word line to the first capacitor, which may reduce an undesirable current flow in the memory element 702 (above the desirable Iread current), thereby preventing a change to the state of the memory element 702. Also, by removing charge from node VXSP and/or the word line the first capacitor may help to reduce the time it takes for the voltage on the see word line to stabilize such that the memory cell can be sensed.

Step 908 includes disconnecting the first capacitor from the second conductive line. The first capacitor can be disconnected after the voltage on the second conductive line has stabilized, but it is not required that the memory system wait until the voltage has stabilized to disconnect the first capacitor from the second conductive line. In one embodiment, the memory system connects more than one capacitor to the second conductive line to quickly reduce the voltage on the second conductive line. Then, after the voltage has dropped considerably, the memory system disconnects one of the capacitors with the other capacitor remaining connected to the second conductive line. These two capacitors may include a larger capacitor and a smaller capacitor. A purpose of the larger capacitor is to be sufficiently large to quickly discharge VXSP. However, a large capacitance can lead to longer settling time to Vfinal required to differentiate the two states of the memory cell. Hence attaching two capacitors can quickly discharge VXSP. Then, disconnecting the larger capacitor and leaving behind a smaller capacitor can speed up settling time so VXSP arrives at Vfinal sooner. This technique of using two capacitors can be used to reduce the time it takes for the voltage to stabilize on the second conductive line.

Step 910 includes sensing the memory cell while current is driven through the memory cell and both capacitors, or the first or second capacitor are disconnected from the second conductive line, or neither. In one embodiment, the sensing is for a Read1 of an SRR. In one embodiment, a second capacitor is connected to the VXSP to sense the memory cell. The second capacitor may be used in a Read1 of a SRR to sense and store a voltage at VXSP. In one embodiment, the sensing is for a midpoint read. In an embodiment of a midpoint read, the sense amp 806 may compare the voltage at VXSP to a reference voltage (Vref) after VXSP has settled adequately near Vfinal (so the difference is less than available margin in sensing the bit state.

Figure 10:
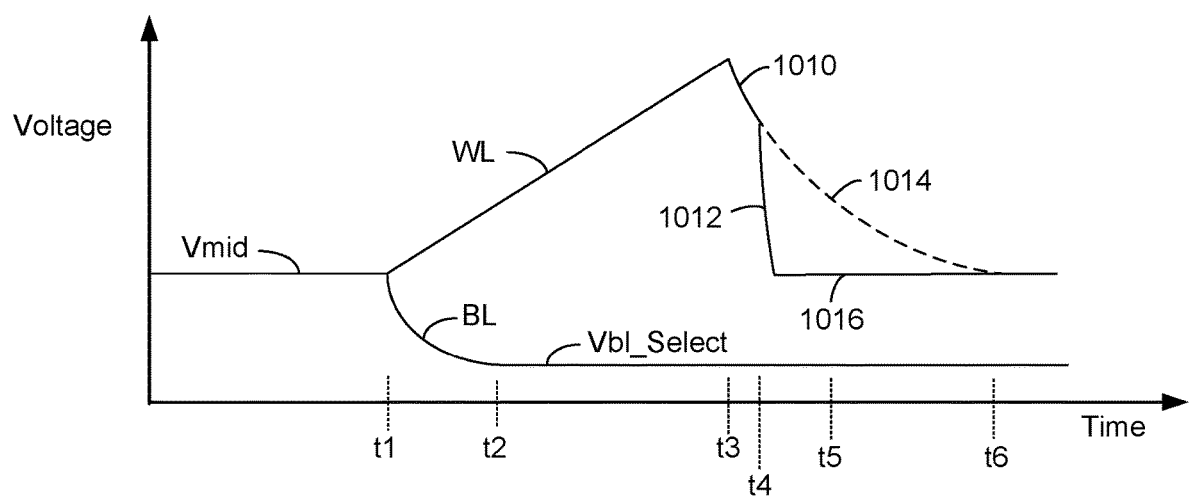
FIG. 10 shows voltages on the bit line and word line during reading of a memory cell having a threshold switching selector.

FIG. 10 shows voltages on the bit line and word line during reading of a memory cell having a threshold switching selector. Initially, the voltage on the bit line and word line are each set to Vmid (e.g., about 1.65V). At t1 the bit line is connected to ground, wherein the voltage on the bit line is reduced from Vmid to ground by t2. In this example, near ground is the select voltage for the bit line. Also at t1 the voltage on the word line (WL) begins to increase due to the current source 802 coming to provide a current to the word line. This current may be equal to the read current used when the voltage is sensed and used. At t3 the threshold switching selector 502 switches on. The resistance of the threshold switching selector 502 may reduce rapidly when it switches on, which may be referred to herein as "snapback" which is difference between the voltage on the word line where the OTS comes on and the voltage on the Word Line after it settles with the Read current flowing through the selected memory element. The voltage on the word line begins to fall at t3 (see plot 1010). At t4, a first capacitor is connected to the word line, which rapidly discharges the word line (see plot 1012). The word line may more quickly reach a stable voltage (see plot 1016). The memory cell may be sensed while the word line is at a stable voltage, such as at t5 instead of having to wait until t6 if a first capacitor is not connected to the word line. In an embodiment, the first capacitor is disconnected from the word line prior to sensing the memory cell. In one embodiment, a second (sensing) capacitor may be connected to the word line to sense and store the voltage from the memory cell, for later adjustment into the midpoint of signal difference possible from the memory cell. This second (sensing) capacitor may also be connected to the word line while the first capacitor is connected to the word line. The first capacitor may also be used to sense and store instead of the second capacitor. The first capacitor may be adjusted in size for the optimum drop in VXSP voltage as it is primarily responsible for discharging the word line. If the first capacitor had not been connected to the word line, then the voltage on the word line may take much longer to reduce and settle (see plot 1014).

Therefore, sensing of the memory cell would have needed to wait unit after t6. Therefore, connecting the first capacitor to the word line after the threshold switching selector 502 switches on may reduce read latency. Furthermore, the snapback could potentially result in an undesirable current in the memory element 702, which could potentially flip the state of the memory element 702 thereby resulting in a read error. However, connecting the first capacitor to the word line after the threshold switching selector 502 switches on may divert such undesired current away from flowing in the memory element 702 to instead flow into the first capacitor, thereby preventing the aforementioned flip in the memory element's state.

Figure 11:
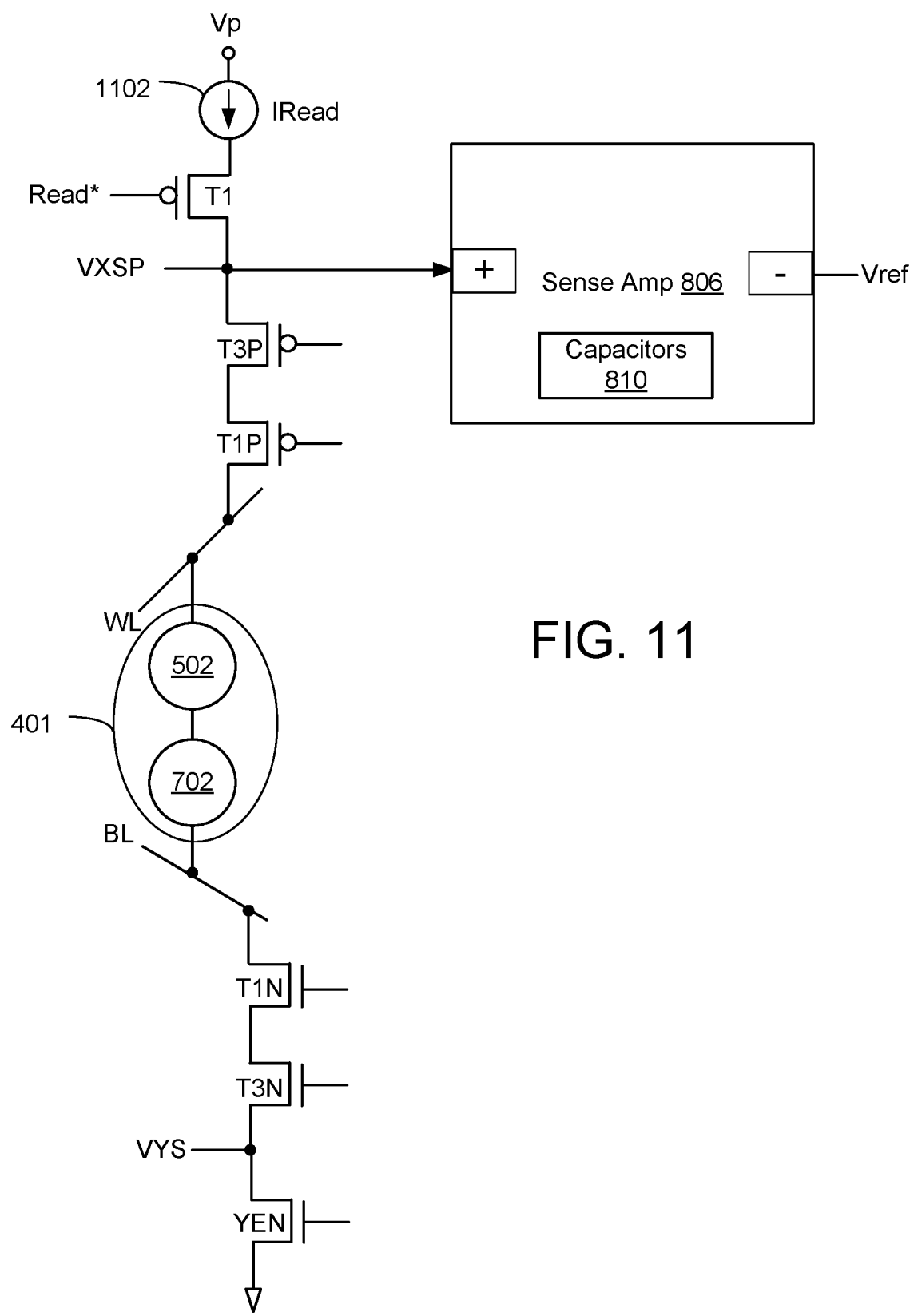
FIG. 11 is a schematic diagram of one embodiment of a read path that is connected to a sense amplifier.

FIG. 11 is a schematic diagram of one embodiment of a read path, as well as a sense amplifier. The read path includes a current source, word line decode transistors, the selected word line, the memory cell, the selected bit line, and bit line decode transistors. The read path has a Vp positive power supply, such as 4V. The read current source 1102 is connected to the power supply (Vp) and supplies Iread to the memory cell. The read current may be enabled by taking Read* to low to turn on transistor T1. The output of T1, which is node VXSP, also drives the non-inverting input (+) of the differential sense amp 806. P-channel transistor T3P serves as a global WL decoder, which may be selected when the gate of T3P is low, such as when driven by a binary decoder address signal from the host. P-channel transistor T1P serves as a local WL decoder, which may be selected when the gate of T1P is low, such as when driven by a binary decoder address signal from the host. P-channel transistor T3P may serve as a driver to the selected WL. The memory cell 401 is connected between the selected WL and the selected BL. The memory cell (or bit) has a threshold switching selector 502 and a memory element 702. The selected WL may be 1 of N WLs in an array. The selected BL may be 1 of M BLs in an array. The memory cell 401 may reside at a cross-point of the selected WL and the selected BL on a chip with one or more arrays. N-channel transistor T1N may serve as a local decode driver into the selected BL. The BL may be selected when T1N gate is high, such as when driven by a binary decoder address signal from the host. N-channel transistor T3N may serve as a global decoder, which is selected when T3N gate is high, such as when driven by a binary decoder address signal from the host. The output of T3N is VYS. A driver (YEN) is between VYS and a negative power supply (GND). To write reverse, there may be a separate driver connected to VYS and a positive power supply Vp to which VYS is driven, and a parallel p-ch transistor decode path (n-ch T1 and T3) may be provided in parallel with the here described n-ch driver path. The n-ch path is then turned off and the p-ch path enabled along with a driver transistor to Vp with gate at ground. Similarly a n-ch path may be provided provide along with a current source to ground provided in parallel with the above described p-ch path to the word line with its current source to Vp or some other more suitable voltage. The p-ch path is then turned off and the n-ch path enabled by turning on an n-ch driver transistor in series with a current source to ground. The sense amp 806 has a non-inverting input (+) and an inverting input (−). The inverting input (−) is provided with a reference voltage (Vref). The non-inverting input (+) is connected to VXSP.

Operation of the read path may in one embodiment be as follows. Node VXSP, the selected WL, the selected BL and VYS may be transistor pre-charged to Vmid during a standby phase. The desired WL line (1 of N) may be selected by turning off the precharge and applying a low voltage to the gates of transistors T3P and TIP (the gate voltages being referred to as decode address signals). The BL line may be selected by turning off the precharge and applying a high voltage to the gates of transistors TIN and T3N (the gate voltages being referred to as decode address signals). The gate of transistor YEN may be taken high to connect node VYS to GND. Iread may then be turned on and connected to VXSP by taking the gate of T1 low (e.g., Read* goes low). The BL may thus be rapidly pulled to GND by its active driver upon turn-on by YEN going H. The selected WL and VXSP are ramped towards Vp by Iread at a rate of Time=Ctotal×V/Iread. The threshold switching selector 502 turns on when the voltage on WL reaches an approximate voltage of Vth (OTS) since I×R drops from leakage are relatively low. Here, Vth (OTS) refers to the threshold switching voltage of the threshold switching selector 502, which may be but it not required to be an OTS. Then, the voltage on VXSP into the sense amp 806 settles back at Vfinal=Vread (final)=Voff (OTS)+Rpath×Iread. Here, Rpath includes WL and BL wire resistances, the address transistors (T3P, TIP, TIN, T3N) and the driver (YEN) to GND, as well as the resistance of the memory element itself 702. Here, Voff (OTS) refers to a voltage across the threshold switching selector 502. The sense amp 806 compares Vfinal that is input on sense amp (+) to Vref on sense amp (−).

Figure 12:
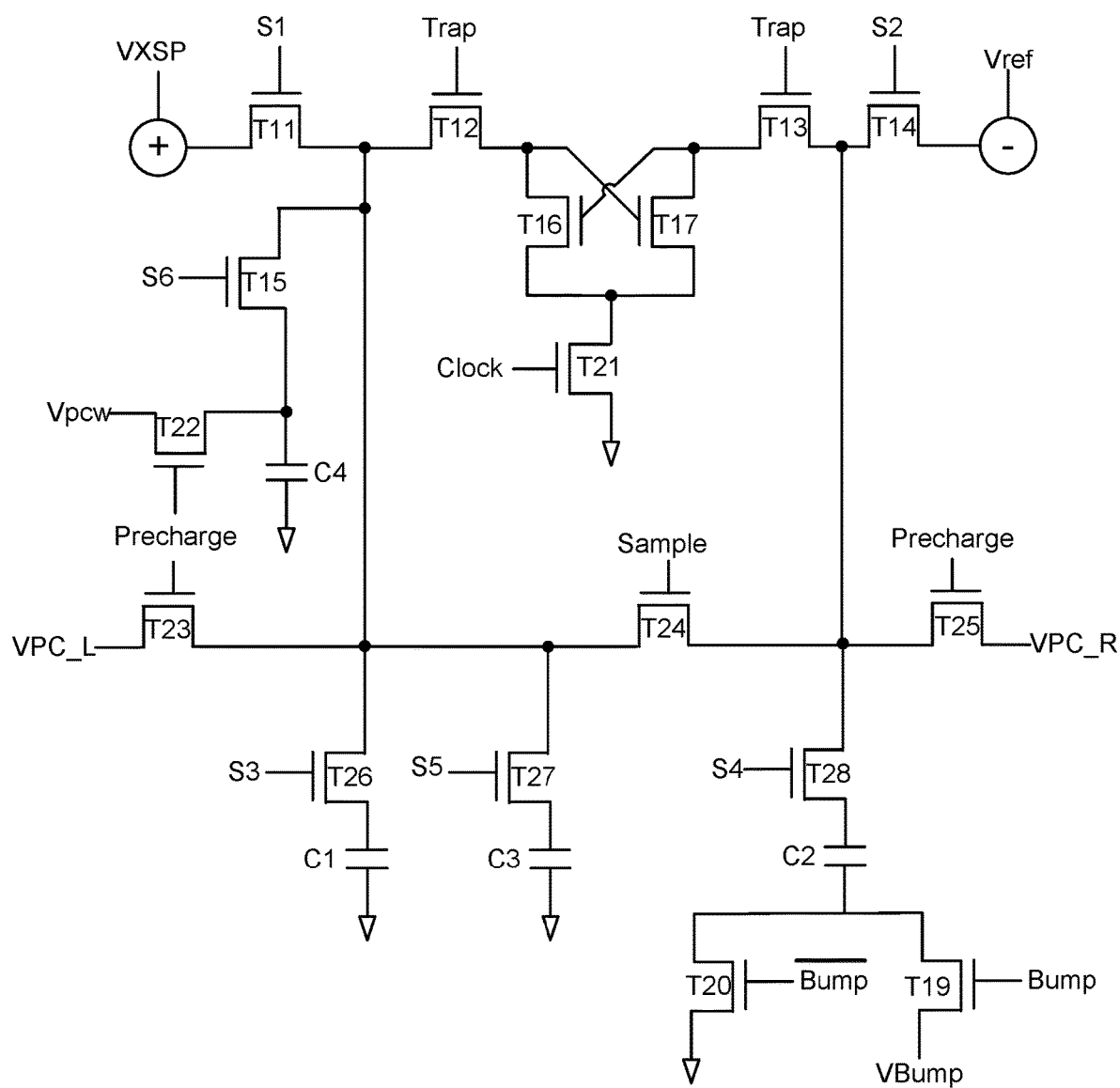
FIG. 12 is a schematic diagram of one embodiment of the sense amp.

FIG. 12 is a schematic diagram of one embodiment of the sense amp 806. For each of the n or p-ch transistors, the compliment transistor (p or n-ch) can be added in parallel and driven by the compliment signal, except for the cross couple and clocked transistors T16. T17, T21. The sense amp 806 has a number of capacitors C1, C2, C3, and C4. In an embodiment, C1 is a snapback discharge capacitor that is used to discharge VXSP when or just after the threshold switching selector 502 switches on. In an embodiment, C2 is a Read1 storage capacitor that is used for sensing VXSP (e.g., sensing the memory cell). Note that C2 may also store the voltage sensed at VXSP for later comparison of a voltage sensed at VXSP during Read2 (with a suitable adjustment to the voltage stored on C2 by turning off T28 and then pulsing positive Vbump enough to raise the voltage, for example 150 mv). Transistors T19 and T20 provide the ability to toggle between Vbump and ground using the Bump and Bump_Bar signals. Bump bar here is the logical compliment of Bump. In an embodiment, C3 is a write reset discharge capacitor that is used to discharge VXSP (e.g., discharge the selected WL) after a destructive write of an SRR. Capacitor C3 may be used to speed the discharge of the selected WL that occurs when the current decreases from Iwrite to Iread. In an embodiment, C4 is a write reset charge capacitor that is used to charge VXSP (e.g., charge the selected WL) at the beginning of the destructive write of the SRR. Capacitor C4 may be used to speed the charge of the selected WL when the current increases from a read current to a write current. In an embodiment, the sense amp 806 has a fifth capacitor C5 (not depicted in FIG. 12) that may be used as a write set charge capacitor. The optional fifth capacitor C5 may be used to charge VXSP (e.g., charge the selected WL) at the second write of the SRR that is used to restore the original state of the memory cell 401, if needed. Further details of the sense amp 806 will be discussed below.

In some embodiments, a capacitor in the sense amplifier is used during a globally referenced read to discharge the selected word line when (or soon after) the threshold switching selector turns on. In an embodiment, C1 is a snapback discharge capacitor that is used to discharge VXSP when or just after the threshold switching selector 502 switches on. In one embodiment, the process 900 of FIG. 9 is used for a globally referenced read in which C1 is used as a snapback discharge capacitor that is used to discharge VXSP when or just after the threshold switching selector 502 switches on.

FIG. 13 is a table 1300 that indicates timing of signals in the sense amp 806 for an embodiment of a globally referenced read in which C1 is used as a snapback discharge capacitor. The table 13 lists signals that are applied at gates of various transistors in the sense amp 806 in FIG. 12. The Read signal refers to the signal that activates the read current (see Read* at gate of T1 in FIG. 11). The table 1300 provides a description of each signal. Each time box represents a time interval during which a signal is enabled (black) or disabled (white). The time boxes are ordered from earlier times to later times, but each time box does not necessarily have the same duration. The table serves to illustrate the contemporaneous relationships among the signals. The optimal transitions between enabled and disabled signal states do not need to occur at the start of the time interval and can be shifted in time relative to other signals in the same time box. At Box0 one or more capacitors in the sense amp 806 are pre-charged. In an embodiment, C1 is pre-charged to a voltage such as near ground that is tuned to provide for a fast discharge of VXSP near its ReadVfinal during Read1. In one embodiment, C1 is pre-charged to near GND, and in another embodiment to near Vmid. The size of C1 may be selected based on other capacitances in the circuit. For example, the size of C1 may be selected based on capacitances along the read path. These read path capacitance can be segmented into two separate capacitance C_CMOS and C_array. For example, C_CMOS is the combined capacitance of the transistors, wires, and circuitry between the in the Read path between the current mirror and the crosspoint array. Namely, C_CMOS represents all of the capacitance outside of the crosspoint array whose stored charge would discharge through the selected memory cell after the selector turns on. C_array is the combined capacitance of the selected WL or BL, vias, and other wiring located between the select transistor and selected memory element. As one example, C1 may be between about 10% to 50% of the combined CMOS and array capacitance. The CMOS and array capacitance can be in the range of 50 to 200 fF or greater. An example range for C1 is between 10 to 100 femtofarads (fF) (i.e., between $10 \times 10^{-15}$ farads to $100 \times 10^{-15}$ farads) where the actual range and size is adjusted by process choice for the CMOS transistors and their size, the array wire length, width, and space (pitch) and memory cell diameter (CD) and height and side slope angle along the memory and selector elements. At box 0, Trap, Precharge, S1 and S3 are high. At box 1, Trap, Precharge, S1 and S3 are low.

At box 1 in FIG. 13 (time t1 in FIG. 10) the Read signal is used to enable the read current (e.g., T1 in FIG. 11 is turned on). As has been previously discussed, the read current will charge up the selected WL. The duration of Box 1 is sufficiently long to provide adequate voltage for threshold switching selector 502 to turn on (time t3 in FIG. 10). Trap is low in box 1 and high at boxes 2 and 3. When Trap is low the sense amp is isolated from the data in. Trap high enables the signal into the sense amp. At boxes 2 to 4 S1 is high. At box 2 S3 is high. Referring to FIG. 12, "Trap" is applied to T12 and T13 at boxes 2 and 3. At box 2, the VXSP and VREF connections are enabled. Referring to FIG. 12, S1 is applied to T11 to connect the sense amp 806 to VXSP. At box 2 (time t4 in FIG. 10), signal S3 is used to enable the snapback discharge capacitor C1, which is disconnected at box 3. Referring to FIG. 12, S3 is applied to the gate of T26 to connect C1 to VXSP. Therefore, the snapback discharge capacitor C1 may discharge VXSP (and hence will discharge the voltage on the WL). After Box 3, the snapback discharge capacitor C1 is disconnected from VXSP. Note that with T11 and T12 and T13 and T14 all on, T16 and T17 are connected to VXSP and Vref. Also, S2 is high at boxes 3 and 4 to enable the Vref connection. Referring to FIG. 12, S2 is applied to T14 to enable Vref. Note that with T13 and T14 both on, cross-coupled T16 and T17 are connected to Vref and VXSP. Therefore, the VXSP voltage at the non-inverting input (+) may be compared with Vref at the inverting input (−) by asserting Clock. At Box 4 the sense amp output is clocked on. Referring to FIG. 12, Clock is applied to T21.

Figure 14A:
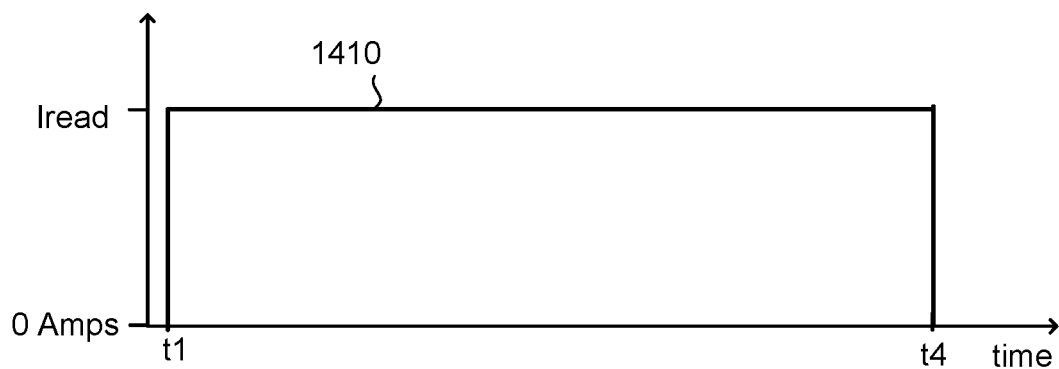
FIGS. 14A and 14B depict further details of timing signals during an embodiment of a globally referenced read.
Figure 14B:
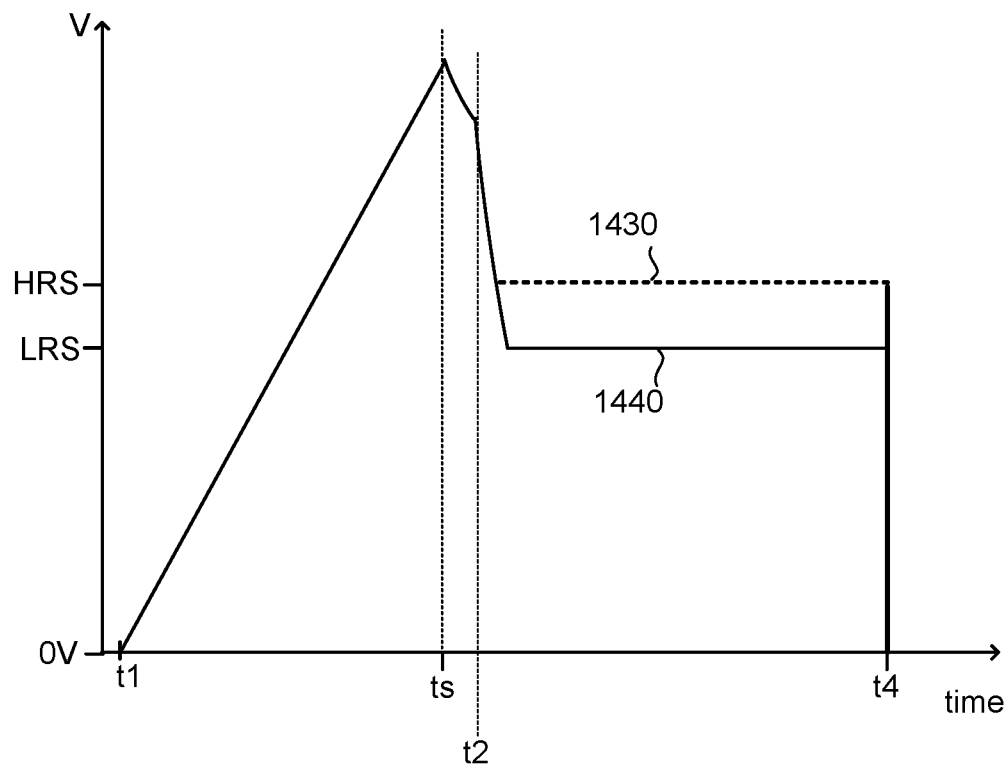

FIGS. 14A and 14B depict further details of timing signals during an embodiment of a globally referenced read. FIG. 14A depicts the read current 1410 being provided to the selected WL between t1 and t4. FIG. 14B depicts the voltage on the selected WL. The voltage across the memory cell increases from t1 to ts. The threshold switching selector is off between t1 and ts. Between t1 and ts, the current causes the word line voltage to increase. The current also supports any leakage in the path. Once the voltage across threshold switching selector reaches the threshold voltage $V_{th}$ of the threshold switching selector 502, it will turn on and switch to a low resistance state (at ts). Once the threshold switching selector 502 is in the on state (at ts), the current may flow through the selected memory cell 401. The WL voltage will fall to a level that depends on the series resistance of the memory element 702, the on-state resistance of the threshold switching selector 502, along with the address select transistors and metal resistance in the read path. At t2 the snapback discharge capacitor C1 is connected to VXSP, which may speed the rate at which the word line falls to its stable voltage. If the memory cell is in the HRS state then the voltage falls to line 1430. If the memory cell is in the LRS state then the voltage falls to line 1440. The sense amp 806 may then sense VXSP and compare with Vref to determine whether the memory cell is in the HRS or LRS. Note that after the snapback discharge capacitor C1 is connected to VXSP at t2 the word line voltage falls very rapidly and stabilizes to reduce read latency. Moreover, the snapback discharge capacitor C1 may prevent the state of the memory cell from flipping prior to sensing the cell by diverting current to the capacitor that might otherwise flow through the memory element 702.

In some embodiments, a capacitor in the sense amplifier 806 is used during an SRR read to discharge the selected word line when (or soon after) the threshold switching selector turns on. In an embodiment, C1 is used as the snapback discharge capacitor that is used to discharge VXSP when or just after the threshold switching selector 502 switches on in an SRR. In one embodiment, the process 900 of FIG. 9 is used during an SRR read in which C1 is used as a snapback discharge capacitor that is used to discharge VXSP when or just after the threshold switching selector 502 switches on. In another embodiment the snapback discharge capacitor remains connected throughout the first read in SRR. In some embodiments, a capacitor in the sense amplifier is used during a SRR read to discharge the selected word line after a write stage of the SRR in preparation for the second Read after destructively writing the bit to AP. In an embodiment, C3 is used as a write reset discharge capacitor during SRR by asserting S5.

FIG. 15 is a table 1500 that indicates timing of signals in the sense amp 806 for an embodiment of an SRR in which C1 is used as a snapback discharge capacitor. C2 is used as the read reference capacitor. Also, C3 is used as a write reset discharge capacitor. The table 1500 lists signals that are applied at gates of various transistors in the sense amp 806 in FIG. 12. The Read signal refers to the signal that activates the read current (see Read* at gate of T1 in FIG. 11). At box 0 one or more capacitors in the sense amp 806 are pre-charged. The pre-charge voltages of the C1, C2, and C3 can be different. In an embodiment, C1 is pre-charged to a voltage that is tuned to provide for a fast discharge of VXSP after the threshold switching selector 502 turns on. In another embodiment, C1 is pre-charged to GND. In another embodiment C1 is pre-charged to Vmid (VPC), for example if the Vth is closer to Read Vfinal. The size of the capacitors C1 and C3 may be selected based on other capacitances in the circuit. For example, the size of the capacitors C1 and C3 may be selected based on capacitance along the read path. An example range for C1 is between 10 to 100 femto farads (fF). In an embodiment, C2 is pre-charged to a voltage that is suitable for sensing. In one embodiment, C2 is pre-charged to GND and in another to Vmid (VPC). An example range for C2 is between 1 to 10 femto farads (fF). In an embodiment, C3 is pre-charged to a voltage that is tuned to provide for a fast discharge of VXSP after the destructive write of the SRR. In one embodiment, C3 is pre-charged from GND to Vmid (VPC). As one example, C3 may be between about 10% to 50% of C_CMOS+C_array. An example range for C3 is between 10 to 100 femto farads (fF). With reference to FIG. 12, the signal "Precharge" applied to gates of T23 may be used to pre-charge C1 and C3 to VPC. The signal "Precharge" applied to the gates of T25 may be used to pre-charge C2 to VPC or to GND. S1 and S2 are off/L during Precharge. Set to High during Precharge are Trap, S1, S3, S4, and S5 at box 0. Vbump is set to 0V during Precharge.

At box 1 in FIG. 15, the Read signal is used to enable the read current (e.g., T1 in FIG. 11 is turned on). As has been previously discussed, the read current will charge up the selected WL and switch on the threshold switching selector 502. At box 2 until box 4, trap is high. At box 2 until box 4, signal S1 to transistor T11 connects the sense amp 806 to VXSP until box 4 after Sample deasserts. At box 2 until box 3, S3 is used to enable the snapback discharge capacitor C1. Referring to FIG. 12, S3 is applied to the gate of T26 to connect C1 to VXSP. Therefore, the snapback discharge capacitor C1 may discharge VXSP (and hence may discharge the voltage on the WL). In an embodiment S3 may stay high during box 3 to enable more settling time before locking the VXSP voltage on C2 for later use.

At the start of box 3, the read reference capacitor C2 is enabled by asserting Sample and S4 until the end of box 3. At start of box 3, the snapback discharge capacitor C1 is disconnected from VXSP. During box 3 sample is brought high to connect C2 to VXSP. Referring to FIG. 12, S4 is applied to T28 to enable the read reference capacitor C2, also "sample" at the gate of T24 is high to connect C2 to VXSP. Therefore, the read reference capacitor C2 may be used to sense and store the voltage on VXSP resulting from reading during the first Read1 of the memory cell 401. Read reference capacitor C2 will store the Read1 result and allow for adjusting its level using Vbump. Also at box 4 after Sample L, the VXSP connection is disabled by bringing S1 low. In one embodiment, the read reference capacitor C2 is enabled together with the snapback discharge capacitor C1 during box 2, with C1 disabled at the end of box 2 and C1 disabled at the end of box 3.

At box 4 the read current, Sample, and Trap are disabled before the write current is enabled, preferably as a transition of increasing Read current to become write current without the current falling below the Read current. The read current may be disabled by turning off T1 (see FIG. 11). Between box 4 and box 6 Trap is low, which may avoid pre-charge disturb during write. In an embodiment, there is a separate write current source, similar to the read current source 1102. However, the write current may have a larger magnitude than the read current. At box 4, the write current source may be connected to VXSP to provide Iwrite similar to how the read current source 1102 may be connected to VXSP to supply Iread, or the Read current increased to become Iwrite, or a parallel current source turned on into VXSP to add to the Iread current source. At box 5 the sampled read voltage is bumped using Vbump driving into C2. The bumping of the voltage may be about half the expected voltage difference between the LRS and the HRS (e.g., about 150 mV). FIG. 12 shows how T19 may be used to bump the voltage by Vbump.

At box 7 the write current is disabled and a read current is enabled. The read current may be enabled by again turning on T1 (see FIG. 11). At box 7, the VXSP connection is again enabled. Referring to FIG. 12, S1 is applied to T11 to connect the sense amp 806 to VXSP (note that Trap is high at t7 and t8). At box 7 after write current is reduced to read current, the write reset discharge capacitor C3 is enabled. Referring to FIG. 12, S5 at the gate of T27 is brought high to connect C3 to VXSP. Therefore, C3 may speed the rate of discharge to VXSP to speed the rate at which the WL voltage falls after the current is reduced from Iwrite to Iread.

Trap is High at boxes 7 and 8 and then Low at box 9 before Clock is asserted at box 9. Referring to FIG. 12, "Trap" is applied to T12 and T13 to re-open the sense amp to the signal. Thus, T16 and T17 are connected to VXSP to sample the cell voltage. Also, T16 and T17 are connected through T13 to the bumped up voltage from Read1. In an embodiment Vref is removed since unused for SRR. Therefore, the voltage at the inverting input (+) may be compared with the bumped voltage provided by T19. At box 9 sense amplifier is clocked out. Referring to FIG. 12, Clock is applied to T21.

In some embodiments, a capacitor in the sense amplifier is used during a SRR read to charge the selected word line at the beginning of the destructive write. In an embodiment, C4 is used as a write reset charge capacitor. FIG. 16 is a table 1600 that indicates timing of signals in the sense amp 806 for an embodiment of an SRR in which C4 is used as a write reset charge capacitor. Also, C1 is used as a snapback discharge capacitor and C3 is used as a write reset discharge capacitor, similar to the example in table 1500. Thus, many of the signals in table 1600 are similar to those in table 1500 and will not be discussed again. At box 4 the read current is disabled and the write current is enabled, similar to the discussion of table 1500. Between box 4 and box 6 Trap is low, which may avoid pre-charge disturb during write. Table 1600 shows that capacitors may be pre-charged at to. With reference to FIG. 12, the signal "Precharge" applied to the gate of T22 may be used to pre-charge C4 to Vpcw. The pre-charging of C1, C2, and C3 has been described in connection with table 1500. The size the capacitor C4 may be selected based on other capacitances in the circuit. For example, the size of the capacitor C4 may be selected based on capacitance along the read path. As one example, C4 may be between about 10% to 50% of C_CMOS+C_array. An example range for C4 is between 100 to 200 femto farads (fF). Table 1600 shows that at box 4 the write reset charge capacitor C4 is enabled. With reference to FIG. 12, the signal S6 at the gate of T15 goes high to connect the write reset charge capacitor C4 to VXSP. Note that S1 is being applied to T11 again at box 7 to box 10 to connect the sense amp to VXSP. Also note that Trap is high in boxes 7 and 8.

Figure 17A:
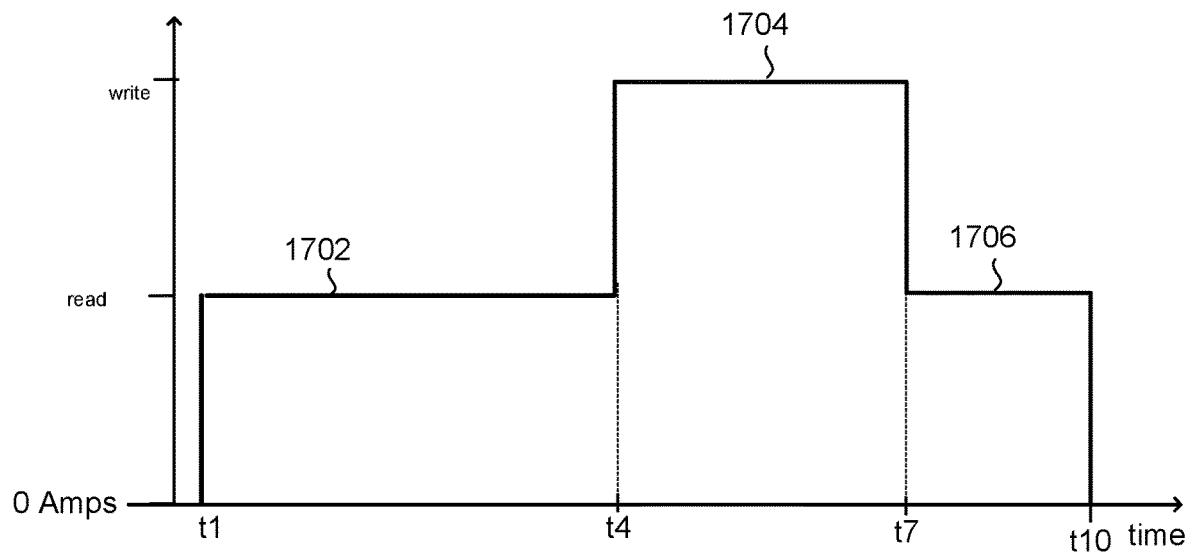
FIGS. 17A and 17B depict further details of timing signals during an embodiment of SRR.
Figure 17B:
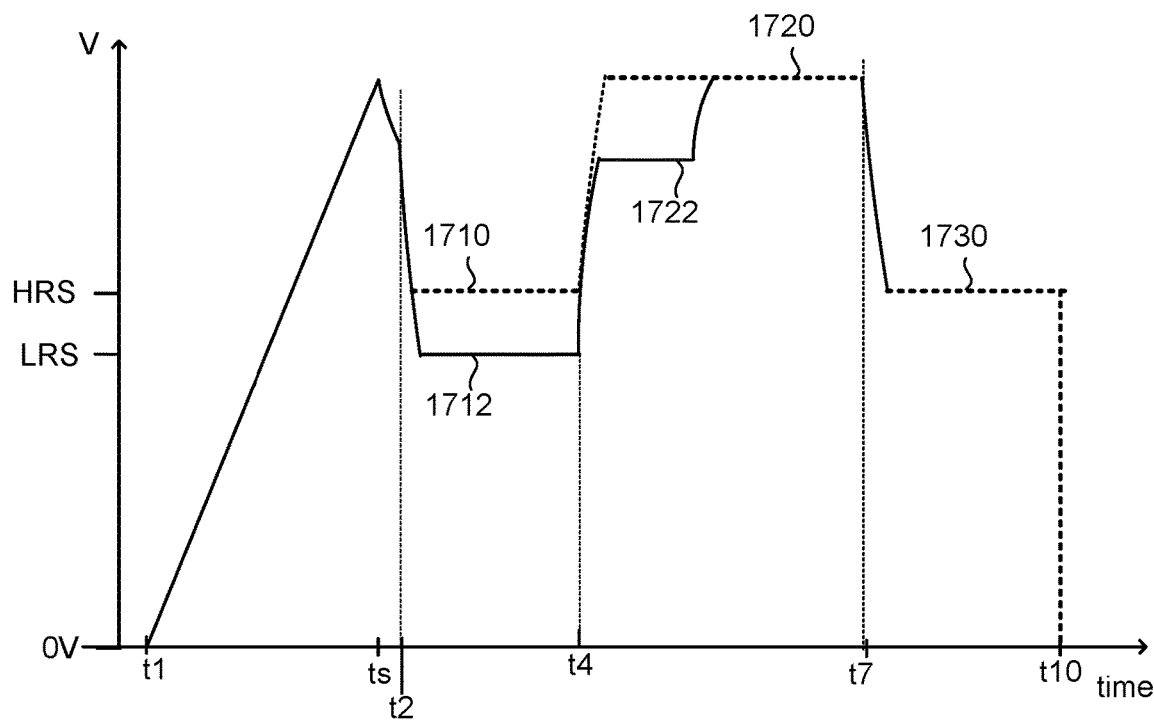

FIGS. 17A and 17B depict further details of timing signals during an embodiment of SRR. FIG. 17A depicts the read current 1702 being provided to the selected WL between t1 and t4, the write current 1704 being provided to the selected WL between t4 and t7, and the read current 1706 being provided to the selected WL between t7 and t10. FIG. 17B depicts the voltage on the selected WL. The voltage across the memory cell increases from t1 to ts. The threshold switching selector is off between t1 and ts. Between t1 and ts, the current causes the word line voltage to increase. The current also supports any leakage in the path. Once the voltage across threshold switching selector reaches the threshold voltage $V_{th}$ of the threshold switching selector 502, it will turn on and switch to a low resistance state (at ts). Once the threshold switching selector 502 is in the on state (at ts), the discharge current induced by OTS turn-on and also Read current (minus leakage to unselected cells) may flow through the selected memory cell 401. The WL voltage will fall to a level that depends on the series resistance of the memory element 702, the on-state resistance and Voffset voltage of the threshold switching selector 502, along with the address select transistors and metal resistance in the read path. At t2 the snapback discharge capacitor C1 is connected to VXSP, which may speed the rate at which the word line falls to its stable value. If the memory cell is in the HRS state then the voltage falls to line 1710. If the memory cell is in the LRS state then the voltage falls to line 1712. Note that after the snapback discharge capacitor C1 is connected to VXSP at t2 the word line voltage falls very rapidly and stabilizes to reduce read latency. Moreover, the snapback discharge capacitor C1 may prevent the state of the memory cell from flipping prior to sensing the cell by diverting some of the discharge current that might otherwise flow through the memory element 702.

At t4 the current increases from Iread to Iwrite. To help speed the rate at which the WL voltage increases in response to the increased current through the memory cell 401, the write reset charge capacitor C4 is connected to the WL at t4 (and S2 left on during t4 use of C4 to allow its effect on VXSP1, and). The WL voltage may increase to level 1720 if the memory cell is already in the HRS. The WL voltage may increase to level 1722 if the memory cell is initially in the LRS. The write current resets the memory cell to the HRS such that the memory cell will end the write phase at level 1720 after an LRS is written to HRS during this write. And remains in HRS if initially in HRS state.

At t7 the current decreases from Iwrite to Iread. To help speed the rate at which the WL voltage decreases in response to the decreased current through the memory cell 401, the write reset discharge capacitor C3 is connected to the WL at t7. The WL voltage decreases rapidly to level 1730.

Figure 18:
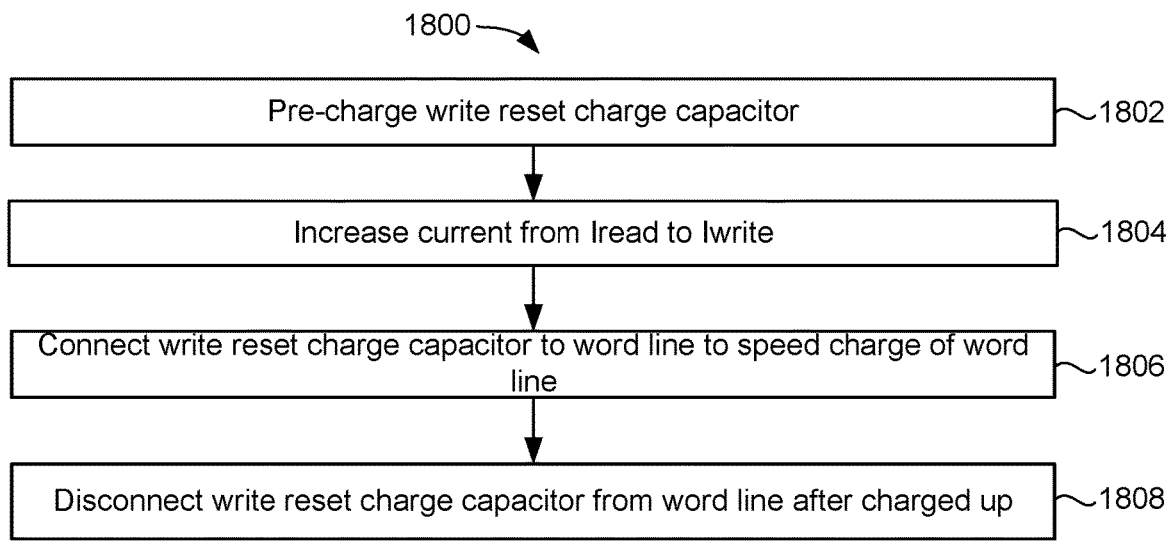
FIG. 18 is a flowchart of one embodiment of a process of controlling a capacitor during a SRR to speed the charge of the word line during a destructive write phase.

FIG. 18 is a flowchart of one embodiment of a process 1800 of controlling a capacitor during an SRR to speed the charge of the word line during a destructive write phase. Step 1802 includes pre-charging the write reset charge capacitor C4. In an embodiment, the write reset charge capacitor C4 is pre-charged to a charge assist voltage. The term "charge assist voltage," as used throughout this document means a voltage on a capacitor that will enable the capacitor to transfer charge to a node (e.g., VXSP) to increase the voltage at the node. In one embodiment, the write reset charge capacitor C4 is pre-charged to Vp (see Vp in FIG. 11). As an example, Vp may be about 4V. Step 1804 includes increasing the current from Iread to Iwrite. Step 1806 includes connecting the write reset charge capacitor C4 to the selected WL to speed the rate of charging the selected WL. Step 1808 includes disconnecting the write reset charge capacitor C4 from the selected WL so speed up decay of the WL to a read voltage level after write ends.

Figure 19:
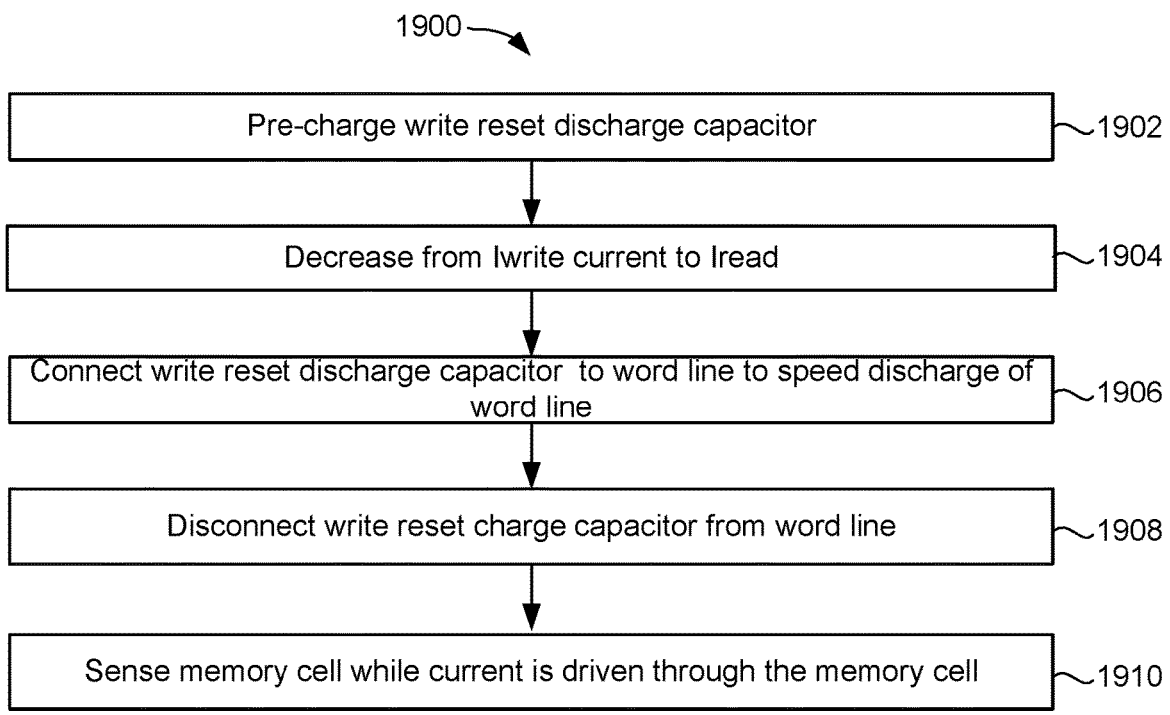
FIG. 19 is a flowchart of one embodiment of a process of controlling a capacitor during a SRR to speed the discharge of the word line after a destructive write phase.

FIG. 19 is a flowchart of one embodiment of a process 1900 of controlling a capacitor during a SRR to speed the discharge of the word line after a destructive write phase. Step 1902 includes pre-charging the write reset discharge capacitor C3. In an embodiment, the write reset discharge capacitor C3 is pre-charged to Vmid (or VPC). In another embodiment, the write reset discharge capacitor C3 is pre-charge to a voltage at or closer to GND. The capacitor and precharge voltage is adjusted to be sure the coupled voltage is not below the Read Vfinal, since this could turn off the OTS and require recharging the WL to Vth before the Read2 voltage is sensed and compared with the adjusted Read1 voltage. Step 1904 includes decreasing the current from Iwrite to Iread. Step 1906 includes connecting the write reset discharge capacitor C3 to the selected WL to speed the rate of dis-charging the selected WL. Step 1908 includes disconnecting the write reset discharge capacitor C3 from the selected WL. Step 1910 includes sensing the memory cell while the read current is driven through the memory cell.

Figures 20, 21:
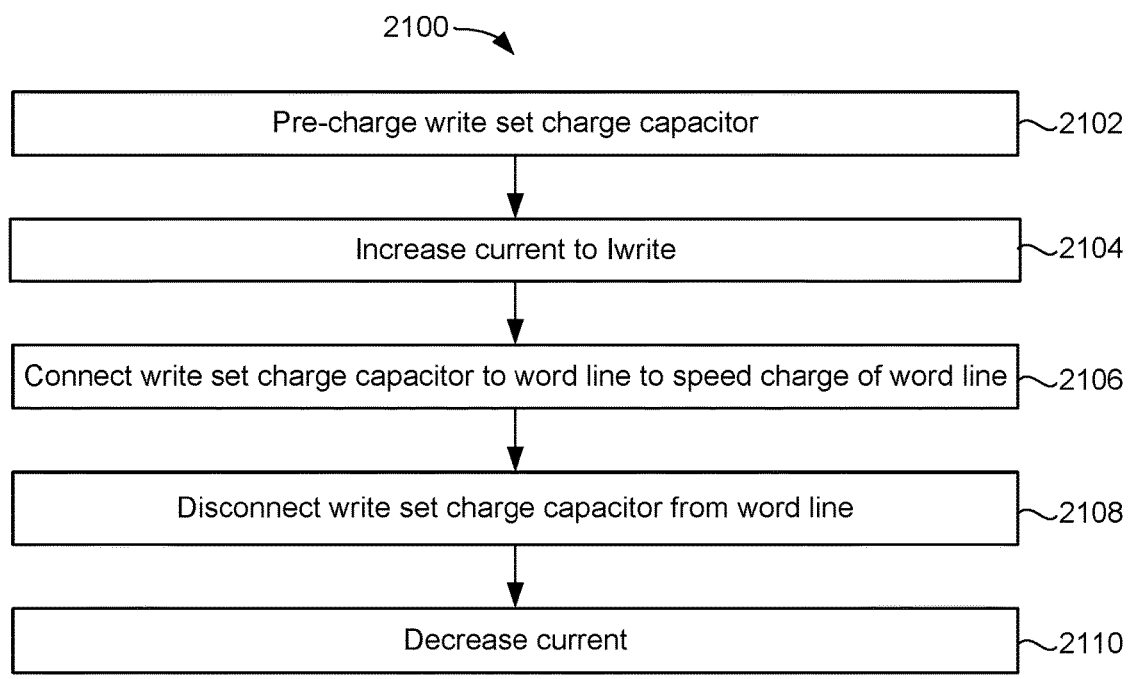
FIG. 20 is a table that indicates timing of signals in the sense amp for an embodiment of a writeback phase of an SRR.
FIG. 21 is a flowchart of one embodiment of a process of controlling a capacitor during a writeback phase of an SRR to speed the charge of the word line.

A final phase of an SRR may include writing the memory cell to restore its original state in the event that the destructive write changed the state. This final phase may be referred to as a write set or as a writeback. The writeback phase may include increasing the current to a write current. In an embodiment, a capacitor in the sense amp 806 may be used to speed the rate of charging the word line towards GND in the writeback phase. In an embodiment, a capacitor in the sense amp 806 may be used to speed the rate of discharging the word line at the conclusion of the writeback phase. FIG. 20 is a table 2000 that indicates timing of signals in the sense amp 806 for an embodiment of a writeback phase of an SRR. The table 2000 refers to a write set charge capacitor (C5), which may be in one embodiment of the sense amp 806. The size the capacitor C5 may be selected based on other capacitances in the circuit. For example, the size of the capacitor C5 may be selected based on capacitance along the read path. As one example, C5 may be between about 10% to 50% of C_CMOS+C_array. An example range for C5 is between 5 to 50 femto farads (fF). At t0 C5 is pre-charged. In an embodiment, C5 is pre-charged to GND (since write for mram is reverse WL and BL direction from destructive write reset). Trap is high at box 11. Between box 12 and box 14 Trap is low, which may avoid pre-charge disturb during write. At t12 a write set current is enabled. The write set current may have the opposite polarity as the write current in the destructive write. At t12, the VXSP connection is enabled by applying S1 to T11 as has been previously discussed. At t12 the write set charge capacitor C5 is enabled. In an embodiment, the write set charge capacitor C5 is added to the sense amp 806 of FIG. 12, along with a transistor that may be used to select the write set charge capacitor C5. A signal S7 may be applied at the gate of this transistor to connect the write set charge capacitor to VXSN (using the n-ch path for write set). Therefore, the write set discharge capacitor C5 may be used to speed the rate at which the WL is charged at the beginning of the writeback phase. Another option is to add a write set discharge capacitor to speed the rate of discharging the word line at the end of the writeback phase.

FIG. 21 is a flowchart of one embodiment of a process 2100 of controlling a capacitor during a writeback phase of an SRR to speed the charge of the word line. Step 2102 includes pre-charging a write set charge capacitor C5. In one embodiment, the write set charge capacitor C5 is pre-charged to Gnd. Step 2104 includes increasing the current to Iwrite. Step 2106 includes connecting the write set discharge capacitor C5 to the selected WL to speed the rate of charging the selected WL. Step 2108 includes disconnecting the write set discharge capacitor C5 from the selected WL. Step 2110 includes decreasing the current after the writeback, such as to 0A. In other embodiments, these steps 2108 and 2110 are reversed or done at approximately the same time. Another option is to connect a write set discharge capacitor to speed the rate of discharging the word line at the end of the writeback phase. In another embodiment, a transistor comes on that (precharge) connects the WL and BL to Vmid (along with all other WL and BLs if cycle has ended)

A cross-point memory array may have multiple levels (or decks). The WL and BL voltages may be different for the upper deck and the lower deck. Therefore, modifications may be made to the various circuits depicted herein (e.g., sense amp 806) may be modified accordingly.

In view of the foregoing, it can be seen that, according to an embodiment, an apparatus comprising a sense amplifier having a plurality of capacitors. The apparatus comprises a control circuit in communication with the array and with the plurality of capacitors. The control circuit is configured to connect to an array comprising a plurality of first conductive lines, a plurality of second conductive lines, and memory cells. Each memory cell resides at an intersection of a first conductive line and a second conductive line. Each memory cell comprises a threshold switching selector in series with a memory element. The control circuit is configured to provide a signal to switch on the threshold switching selector of a selected memory cell during a read operation. The selected memory cell resides between a selected first conductive line and a selected second conductive line. The control circuit is configured to connect a first capacitor of the plurality of capacitors to the selected first conductive line after the threshold switching selector has switched on to transfer charge between the selected first conductive line and the first capacitor as a voltage on the selected first conductive line changes. The control circuit is configured to control the sense amplifier to sense the selected memory cell during the read operation while the first capacitor is disconnected from the selected first conductive line.

In a further embodiment, the control circuit is configured to connect the first capacitor to the selected first conductive line to speed discharge of the selected first conductive line to a stable voltage after the threshold switching selector has switched on. The control circuit is configured to control the sense amplifier to sense the selected memory cell while the selected first conductive line is at the stable voltage.

In a further embodiment, the control circuit is configured to pre-charge the first capacitor to a pre-charge voltage that has a magnitude that is tuned to speed the discharge of the selected first conductive line to the stable voltage after the threshold switching selector has switched on.

In a further embodiment, the control circuit is configured to disconnect the first capacitor from the selected first conductive line. The control circuit is configured to connect a second capacitor of the plurality of capacitors to the selected first conductive line. The first capacitor has a different capacitance than the second capacitor. The control circuit is configured to sense the selected memory cell with the second capacitor while the selected first conductive line is at a stable voltage and the first capacitor is disconnected from the selected first conductive line.

In a further embodiment, the control circuit is configured to connect the second capacitor to the selected first conductive line while the first capacitor is connected to the first conductive line. The control circuit is configured to disconnect the first capacitor from the selected first conductive line while keeping the second capacitor connected to the first conductive line.

In a further embodiment, the control circuit is configured to pre-charge the first capacitor to a charge assist voltage prior to connecting the first capacitor to the selected first conductive line. The control circuit is configured to drive a write current to the selected first conductive line to write the selected memory cell after switching on the threshold switching selector and after a first read of a self-referenced read of the selected memory cell during the read operation. The control circuit is configured to connect the first capacitor to the selected first conductive line to speed charging of the selected first conductive line in response to the write current.

In a further embodiment, the control circuit is configured to drive a current having a write magnitude to the selected first conductive line to charge the selected first conductive line to write the selected memory cell after a first read of a self-referenced read of the selected memory cell during the read operation. The control circuit is configured to reduce the current driven to the selected first conductive line to a read magnitude after writing the selected memory cell. The control circuit is configured to connect the first capacitor to speed discharge of the selected first conductive line after reducing the current to the read magnitude.

In a further embodiment, the control circuit is configured to pre-charge the first capacitor to a voltage that is tuned to speed the discharge of the selected first conductive line after the current is reduced to the read magnitude.

In a further embodiment, the control circuit is configured to pre-charge the first capacitor to a charge assist voltage prior to connecting the first capacitor to the selected first conductive line. The control circuit is configured to drive a write current to the selected first conductive line to write the selected memory cell during a writeback phase of a self-referenced read of the read operation. The control circuit is configured to connect the first capacitor to the selected first conductive line to speed charging of the selected first conductive line during the writeback phase.

In a further embodiment, the apparatus comprises the array. The threshold switching selector comprises an Ovonics Threshold Switch (OTS). The memory element comprises a magnetoresistive random access memory (MRAM) element.

An embodiment includes a method for reading a selected memory cell in a cross-point array. The method comprises applying a select voltage to a selected bit line in the cross-point array. The method comprises driving a current to a selected word line in the cross-point array to charge up a voltage on the selected word line. The selected memory cell resides between the selected bit line and the selected word line. The selected memory cell comprises a threshold switching selector in series with a memory element. The method comprises connecting a first capacitor in a sense amplifier to the selected word line after the threshold switching selector has switched on to speed discharge of the selected word line towards a stable voltage while driving the current through a path comprising the selected word line, the selected memory cell, and the selected bit line. The method comprises disconnecting the first capacitor from the selected word line. The method comprises sensing the selected memory cell with the sense amplifier while the selected word line is at the stable voltage while continuing to drive the current through the path with the first capacitor is disconnected from the selected word line.

An embodiment includes a memory system, comprising a cross-point array comprising word lines, bit lines, and programmable resistance memory cells. Each memory cell resides at a cross-point of a word lines and a bit line. Each memory cell comprises a threshold switching selector in series with a programmable resistance memory element. The threshold switching selector has a high resistance in an off state and a low resistance in an on state. The memory system comprises one or more sense amplifiers coupled to the cross-point array. Each sense amplifier comprises one or more capacitors. The memory system comprises a control circuit in communication with the array and the sense amplifiers. The control circuit is configured to apply a select voltage to a selected bit line in the cross-point array. A selected memory cell resides between the selected bit line and a selected word line on a read path that includes a sense node, the selected word line, the selected memory cell, and the selected bit line. The control circuit is configured to drive a current to the selected word line to charge up a voltage on the sense node to switch on the threshold switching selector of the selected memory cell. The control circuit is configured to connect a first capacitor in a first sense amplifier of the one or more sense amplifiers to the sense node after the threshold switching selector has switched on to speed discharge of the sense node towards a stable voltage. The control circuit is configured to disconnect the first capacitor from the sense node. The control circuit is configured to control the first sense amplifier to sense a voltage on the sense node while the sense node is at the stable voltage and while driving a read current through the read path with the first capacitor disconnected from the sense node. Such control circuit may be configured to connect the first capacitor to the sense node and then disconnect the capacitor after its voltage is nearly equal to the sense node. The disconnected voltage can be adjusted up by a voltage and used as a reference to compare by the sense amp to another read voltage on the sense node after a destructive write.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The terms "top" and "bottom," "upper" and "lower" and "vertical" and "horizontal," and forms thereof, as may be used herein are by way of example and illustrative purposes only, and are not meant to limit the description of the technology inasmuch as the referenced item can be exchanged in position and orientation. Also, as used herein, the terms "substantially" and/or "about" mean that the specified dimension or parameter may be varied within an acceptable tolerance for a given application.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
   a sense amplifier having a plurality of capacitors, the sense amplifier configured to sense a sense voltage at a sense node; and
   a control circuit configured to connect to an array comprising a plurality of first conductive lines, a plurality of second conductive lines, and memory cells, wherein each memory cell resides at an intersection of a first conductive line and a second conductive line, wherein each memory cell comprises a two-terminal threshold switching selector in series with a memory element, the control circuit in communication with the array and with the plurality of capacitors, the control circuit configured to:
      provide a signal to switch on the two-terminal threshold switching selector of a selected memory cell during a read operation, wherein the selected memory cell resides between a selected first conductive line and a selected second conductive line;
      connect a first capacitor of the plurality of capacitors through the sense node to the selected first conductive line after the two-terminal threshold switching selector has switched on to transfer charge between the selected first conductive line and the first capacitor as a voltage on the selected first conductive line changes;
      disconnect the first capacitor from the sense node and from the selected first conductive line while the two-terminal threshold switching selector remains on and current flows through the memory element of the selected memory cell to generate the sense voltage at the sense node; and
      control the sense amplifier to sense the selected memory cell during the read operation while the first capacitor remains disconnected from the sense node and from the selected first conductive line, including sensing the sense voltage at the sense node with the first capacitor disconnected from the sense node.

2. The apparatus of claim 1, wherein the control circuit is configured to:
   connect the first capacitor through the sense node to the selected first conductive line to speed discharge of the selected first conductive line to a stable voltage after the threshold switching selector has switched on; and
   control the sense amplifier to sense the selected memory cell while the selected first conductive line is at the stable voltage.

3. The apparatus of claim 2, wherein the control circuit is configured to:
   pre-charge the first capacitor to a pre-charge voltage that has a magnitude that is tuned to speed the discharge of the selected first conductive line to the stable voltage after the threshold switching selector has switched on.

4. The apparatus of claim 1, wherein to sense the sense voltage at the sense node with the first capacitor disconnected from the sense node the control circuit is configured to:
   connect a second capacitor of the plurality of capacitors to the sense node, wherein the first capacitor has a different capacitance than the second capacitor; and
   sense the selected memory cell with the second capacitor while the selected first conductive line and sense node are at a stable voltage and the first capacitor is disconnected from the selected first conductive line and the sense node.

5. The apparatus of claim 4, wherein the control circuit is configured to:
   connect the second capacitor to the selected first conductive line while the first capacitor is connected to the first conductive line; and
   disconnect the first capacitor from the selected first conductive line while keeping the second capacitor connected to the first conductive line.

6. The apparatus of claim 1, wherein the sensing of the sense voltage at the sense node with the first capacitor disconnected from the sense node includes connecting a second capacitor of the plurality of capacitors to the sense node in a first read of a self-referenced read, wherein the control circuit is further configured to:
   pre-charge a third capacitor of the plurality of capacitors to a charge assist voltage prior to connecting the third capacitor to the selected first conductive line;
   drive a write current to the selected first conductive line to write the selected memory cell after switching on the threshold switching selector and after the first read of the self-referenced read of the selected memory cell during the read operation; and
   connect the third capacitor to the selected first conductive line after pre-charging to the charge assist voltage to speed charging of the selected first conductive line in response to the write current.

7. The apparatus of claim 1, wherein the sensing of the sense voltage at the sense node with the first capacitor disconnected from the sense node includes connecting a second capacitor of the plurality of capacitors to the sense node in a first read of a self-referenced read, wherein the control circuit is configured to:
   drive a current having a write magnitude to the selected first conductive line to charge the selected first conductive line to write the selected memory cell after the first read of the self-referenced read of the selected memory cell during the read operation;
   reduce the current driven to the selected first conductive line to a read magnitude after writing the selected memory cell; and
   connect a third capacitor to the selected first conductive line to speed discharge of the selected first conductive line after reducing the current to the read magnitude.

8. The apparatus of claim 7, wherein the control circuit is configured to:
   pre-charge the third capacitor to a voltage that is tuned to speed the discharge of the selected first conductive line after the current is reduced from the write magnitude to the read magnitude.

9. The apparatus of claim 1, wherein the control circuit is configured to:
   pre-charge a second capacitor of the plurality of capacitors to a charge assist voltage prior to connecting the second capacitor to the selected first conductive line;

drive a write current to the selected first conductive line to write the selected memory cell during a writeback phase of a self-referenced read of the read operation; and connect the second capacitor to the selected first conductive line after pre-charging to the charge assist voltage to speed charging of the selected first conductive line during the writeback phase.

10. The apparatus of claim 1, wherein:
the apparatus comprises the array;
the threshold switching selector comprises an Ovonics Threshold Switch (OTS); and
the memory element comprises a magnetoresistive random access memory (MRAM) element.

11. A method for reading a selected memory cell in a cross-point array, the method comprising:
applying a select voltage to a selected bit line in the cross-point array;
driving a current to a selected word line in the cross-point array to charge up a voltage on the selected word line, wherein the selected memory cell resides between the selected bit line and the selected word line, wherein the selected memory cell comprises a two-terminal threshold switching selector in series with a programmable resistance memory element;
connecting a first capacitor in a sense amplifier to the selected word line after the threshold switching selector has switched on to speed discharge of the selected word line towards a stable voltage while driving the current through a path comprising the selected word line, the selected memory cell, and the selected bit line to generate a sense voltage at a first input of the sense amplifier;
disconnecting the first capacitor from the selected word line; and
sensing the selected memory cell with the sense amplifier while the selected word line is at the stable voltage while continuing to drive the current through the path with the first capacitor is-disconnected from the selected word line, including sensing the sense voltage at the first input of the sense amplifier with the first capacitor disconnected from the first input of the sense amplifier.

12. The method of claim 11, further comprising:
pre-charging the first capacitor to a pre-charge voltage that has a magnitude that is tuned to speed the discharge of the selected word line to the stable voltage after the threshold switching selector has switched on.

13. The method of claim 11, wherein sensing the sense voltage at the first input of the sense amplifier with the first capacitor disconnected from the first input of the sense amplifier includes connecting a second capacitor in the sense amplifier to the first input of the sense amplifier in a first read of a self-referenced read, and further comprising:
performing a destructive write of the selected memory cell after sensing the selected memory cell with the second capacitor, including driving a write current through the path;
lowering the current through the path from the write current to a read current after performing the destructive write; and
connecting a third capacitor in the sense amplifier to the selected word line while the current through the path is at the read current to speed the discharge of voltage on the selected word line in response to the lowering of the current through the path.

14. The method of claim 13, further comprising:
disconnecting the third capacitor from the selected word line;
bumping the voltage on the second capacitor; and
sensing the selected memory cell in a second read of the self-referenced read, including continuing to drive the read current through the path with the third capacitor disconnected from the selected word line to generate a second sense voltage at the first input of the sense amplifier and comparing the second sense voltage with the bumped voltage on the second capacitor.

15. A memory system, comprising:
a cross-point array comprising word lines, bit lines, and programmable resistance memory cells, wherein each memory cell resides at a cross-point of a word lines and a bit line, wherein each memory cell comprises a threshold switching selector in series with a programmable resistance memory element, wherein the threshold switching selector has a high resistance in an off state and a low resistance in an on state;
one or more sense amplifiers coupled to the cross-point array, wherein each sense amplifier comprises one or more capacitors, wherein each sense amplifier comprises a first input and a second input, wherein each sense amplifier is configured to compare a first voltage at the first input with a second voltage at the second input; and
a control circuit in communication with the array and the one or more sense amplifiers, the control circuit configured to:
apply a select voltage to a selected bit line in the cross-point array, wherein a selected memory cell resides between the selected bit line and a selected word line on a read path that includes a sense node, the selected word line, the selected memory cell, and the selected bit line;
drive a read current to the selected word line to charge up a voltage on the sense node to switch on the threshold switching selector of the selected memory cell;
connect a first capacitor in a first sense amplifier of the one or more sense amplifiers to the sense node after the threshold switching selector has switched on to speed discharge of the sense node towards a stable voltage while the read current continues to be driven to the selected word line;
disconnect the first capacitor from the sense node while the read current continues to be driven to the selected word line; and
control the first sense amplifier to connect the first input to the sense node to sense a voltage on the sense node while the sense node is at the stable voltage and while continuing to drive the read current through the read path with the first capacitor disconnected from the sense node.

16. The memory system of claim 15, wherein the control circuit is further configured to:
pre-charge the first capacitor to a pre-charge voltage that has a magnitude that is tuned to speed discharge of the sense node after the threshold switching selector has switched on.

17. The memory system of claim 15, wherein the control circuit is further configured to:
sense the selected memory cell in a first read of a self-referenced read with a second capacitor in the first sense amplifier connected to the sense node while the sense node is at the stable voltage and while the first capacitor is disconnected from the sense node;

perform a destructive write of the selected memory cell after sensing the selected memory cell with the second capacitor, including drive a write current through the read path;

lower the current to the read path to the read current after performing the destructive write; and connect a third capacitor of the first sense amplifier to the sense node while the current is at the read current to speed the discharge of the voltage on the sense node in response to the lowering of the current.

18. The memory system of claim 17, wherein the control circuit is further configured to:

pre-charge the third capacitor to a pre-charge voltage that has a magnitude that is tuned to speed discharge of the sense node in response to the lowering of the current from the write current to the read current.

19. The memory system of claim 17, wherein the control circuit is further configured to:

pre-charge a fourth capacitor of the first sense amplifier to a charge assist voltage;

increase the current to the read path from the read current to the write current after sensing the selected memory cell with the second capacitor; and connect the fourth capacitor to the sense node while the current is at the write current to speed the charge of the voltage on the sense node.

* * * * *